(12) United States Patent
Maleki et al.

(10) Patent No.: US 12,348,449 B2
(45) Date of Patent: Jul. 1, 2025

(54) ADDITIONAL REFERENCE SIGNALS FOR UES IN NON-CONNECTED STATES

(71) Applicant: Telefonaktiebolaget LM Ericsson (publ), Stockholm (SE)

(72) Inventors: Sina Maleki, Malmö (SE); Ali Nader, Malmö (SE); Claes Tidestav, Bålsta (SE); Ajit Nimbalker, Fremont, CA (US); Andres Reial, Höllviken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 458 days.

(21) Appl. No.: 17/799,132

(22) PCT Filed: Feb. 10, 2021

(86) PCT No.: PCT/EP2021/053155
§ 371 (c)(1),
(2) Date: Aug. 11, 2022

(87) PCT Pub. No.: WO2021/160647
PCT Pub. Date: Aug. 19, 2021

(65) Prior Publication Data
US 2023/0078444 A1    Mar. 16, 2023

Related U.S. Application Data

(60) Provisional application No. 62/976,415, filed on Feb. 14, 2020.

(51) Int. Cl.
*H04L 5/00* (2006.01)
*H04W 52/02* (2009.01)
*H04W 76/27* (2018.01)

(52) U.S. Cl.
CPC ....... *H04L 5/0051* (2013.01); *H04W 52/0229* (2013.01); *H04W 76/27* (2018.02)

(58) Field of Classification Search
CPC ... H04L 5/0051; H04L 5/0094; H04L 5/0089; H04L 5/005; H04W 52/0229;
(Continued)

(56) References Cited

U.S. PATENT DOCUMENTS

2014/0044040 A1   2/2014  Chen et al.
2016/0345348 A1*  11/2016 Chae ...................... H04W 76/14
(Continued)

FOREIGN PATENT DOCUMENTS

CN    110557812 A  * 12/2019  ........... H04L 5/0048
CN    113259071 A  *  8/2021  ........... H04L 5/0048
(Continued)

OTHER PUBLICATIONS

"3GPP TS 38.211 V16.0.0", 3rd Generation Partnership Project; Technical Specification Group Radio Access Network; NR; Physical channels and modulation (Release 16), Dec. 2019, pp. 1-129.
(Continued)

*Primary Examiner* — Sujoy K Kundu
*Assistant Examiner* — Vladislav Y Agureyev
(74) *Attorney, Agent, or Firm* — Murphy, Bilak & Homiller, PLLC

(57) ABSTRACT

Embodiments include methods, performed by a user equipment (UE), for receiving reference signals (RS) in a wireless network. Such methods include receiving, from a network node in the wireless network, a configuration for connected-state RS transmitted by the network node. In some embodiments, the connected-state RS can be periodic channel state information RS (CSI-RS) or periodic tracking RS (TRS). Such methods include, while the UE is in a non-connected state and based on the received configuration, determining that the connected-state RS are available during one or more first occasions. Such methods include, while the UE is in the non-connected state, selectively receiving the connected-
(Continued)

state RS during the first occasions. Other embodiments include complementary methods performed by a network node, as well as UEs and network nodes configured to perform such methods.

18 Claims, 15 Drawing Sheets

(58) Field of Classification Search
CPC ......... H04W 52/0209; H04W 52/0216; H04W 68/00; H04W 76/28; H04W 48/10; H04W 72/0446; Y02D 30/70
See application file for complete search history.

(56) References Cited

U.S. PATENT DOCUMENTS

| | | | |
|---|---|---|---|
| 2018/0270895 A1* | 9/2018 | Park | H04W 68/00 |
| 2019/0007897 A1 | 1/2019 | Ng et al. | |
| 2019/0053294 A1* | 2/2019 | Xia | H04W 72/21 |
| 2019/0053320 A1* | 2/2019 | Islam | H04W 52/0229 |
| 2019/0059054 A1* | 2/2019 | Lee | H04W 76/28 |
| 2019/0116461 A1* | 4/2019 | Callender | H04W 36/0088 |
| 2019/0215117 A1 | 7/2019 | Lee et al. | |
| 2019/0254110 A1* | 8/2019 | He | H04L 41/0896 |
| 2019/0319686 A1* | 10/2019 | Chen, IV | H04B 7/0639 |
| 2019/0387490 A1* | 12/2019 | Li | H04W 60/04 |
| 2020/0137602 A1 | 4/2020 | Zhang et al. | |
| 2020/0162976 A1* | 5/2020 | Yang | H04W 68/005 |
| 2020/0204312 A1* | 6/2020 | Xu | H04W 36/085 |
| 2021/0092627 A1* | 3/2021 | Radulescu | H04L 5/0053 |
| 2021/0185757 A1* | 6/2021 | Purkayastha | H04W 76/27 |
| 2021/0195656 A1* | 6/2021 | Lei | H04L 5/0053 |
| 2021/0235381 A1* | 7/2021 | Yang | H04W 72/0466 |
| 2021/0321413 A1* | 10/2021 | Shin | H04W 72/23 |
| 2022/0369284 A1* | 11/2022 | Gonzalez | H04W 68/025 |
| 2023/0049119 A1* | 2/2023 | Liu | H04W 52/0225 |
| 2023/0056906 A1* | 2/2023 | Yang | H04W 52/0216 |
| 2023/0076409 A1* | 3/2023 | Elkotby | H04W 52/0225 |
| 2023/0083399 A1* | 3/2023 | Wang | H04L 5/0051 370/329 |
| 2023/0085484 A1* | 3/2023 | Liu | H04W 68/02 370/311 |

FOREIGN PATENT DOCUMENTS

| | | | | |
|---|---|---|---|---|
| CN | 113260022 A | * | 8/2021 | H04B 7/0639 |
| EP | 3276847 A1 | * | 1/2018 | H04B 7/0404 |
| EP | 3739939 A1 | | 11/2020 | |
| WO | 2019029711 A1 | | 2/2019 | |
| WO | 2019137424 A1 | | 7/2019 | |

OTHER PUBLICATIONS

"3GPP TS 38.214 V15.0.0", 3rd Generation Partnership Project; Technical Specification Group Radio Access Network; NR; Physical layer procedures for data (Release 15), Dec. 2017, pp. 1-71.
"3GPP TS 38.401 V15.7.0", 3rd Generation Partnership Project; Technical Specification Group Radio Access Network; NG-RAN; Architecture description (Release 15), Dec. 2019, pp. 1-47.
"Provisioning of potential TRS/CSI-RS occasion(s) for Idle/Inactive UEs", 3GPP TSG RAN WG1 #102-e, Tdoc R1-2006666, e-Meeting, Aug. 17-28, 2020, pp. 1-5.
"Provisioning of potential TRS/CSI-RS occasion(s) for Idle/Inactive UEs", 3GPP TSG RAN WG1 #103-e, Tdoc R1-2009201, e-Meeting, Oct. 26-Nov. 13, 2020, pp. 1-12.
"3GPP TS 38.214 V16.0.0", 3rd Generation Partnership Project; Technical Specification Group Radio Access Network; NR; Physical layer procedures for data (Release 16), Dec. 2019, pp. 1-147.
"3GPP TS 38.331 V15.8.0", 3rd Generation Partnership Project; Technical Specification Group Radio Access Network; NR; Radio Resource Control (RRC) protocol specification (Release 15), Dec. 2019, pp. 1-532.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 38.133 V0.4.0", 3rd Generation Partnership Project; Technical Specification Group Radio Access Network; New Radio(NR); Requirements for support of radio resource management (Release 15), Dec. 2017, pp. 1-42.
"3GPP TS 38.215 V16.0.1", 3rd Generation Partnership Project; Technical Specification Group Radio Access Network; NR; Physical layer measurements (Release 16), Jan. 2020, pp. 1-21.
"3rd Generation Partnership Project; Technical Specification Group Radio Access Network; NR; User Equipment (UE) procedures in Idle mode and RRC Inactive state (Release 16)", 3GPP TS 38.304 V16.1.0, Jul. 2020, pp. 1-39.
"3rd Generation Partnership Project; Technical Specification Group Services and System Aspects; System Architecture for the 5G System (5GS); Stage 2 (Release 16) The present", 3GPP TS 23.501 V16.2.0, Sep. 2019, pp. 1-391.
"Consideration on TRS/CSI-RS occasion(s) for idle/inactive UEs", 3GPP TSG RAN WG1 Meeting #102, R1-2006269, e-Meeting, Aug. 17-28, 2020, pp. 1-5.
"CSI-RS usage by RRC_Inactive and RRC_Idle UEs", 3GPP TSG-RAN WG2 Nr AH#3, Tdoc R2-1800349, Vancouver, Canada, Jan. 22-26, 2018, pp. 1-2.
"3rd Generation Partnership Project; Technical Specification Group Radio Access Network; Evolved Universal Terrestrial Radio Access (E-UTRA); Requirements for support of radio resource management (Release 16)", 3GPP TS 36.133 V16.3.0, Sep. 2019, pp. 1-3732.
"3rd Generation Partnership Project; Technical Specification Group Radio Access Network; NR; Physical channels and modulation (Release 16)", 3GPP TS 38.211 V16.3.0, Sep. 2020, pp. 1-22.
"3rd Generation Partnership Project; Technical Specification Group Radio Access Network; NR; Physical layer procedures for control (Release 16)", 3GPP TS 38.213 V16.3.0, Sep. 2020, pp. 1-179.
"3rd Generation Partnership Project; Technical Specification Group Radio Access Network; NR; Physical layer procedures for data (Release 16) 3GPP TS 38.214 V16.3.0", 3GPP TS 38.214 V16.3.0, Sep. 2020, pp. 1-166.
"3rd Generation Partnership Project; Technical Specification Group Radio Access Network; NR; User Equipment (UE) procedures in Idle mode and RRC Inactive state (Release 16)", 3GPP TS 38.304 V16.2.0, Sep. 2020, pp. 1-39.
"Additional synchronization provision", 3GPP Tsg Ran WG1 Meeting #90, R1-1714048, Prague, Czech Republic, Aug. 21-25, 2017, pp. 1-6.

* cited by examiner

FIG. 7A
```
-- ASN1START
-- TAG-NZP-CSI-RS-RESOURCE-START
NZP-CSI-RS-Resource ::=     SEQUENCE {
    nzp-CSI-RS-ResourceId       NZP-CSI-RS-ResourceId,
    resourceMapping             CSI-RS-ResourceMapping,
    powerControlOffset          INTEGER (-8..15),
    powerControlOffsetSS        ENUMERATED{db-3, db0, db3, db6}          OPTIONAL,  -- Need R
    scramblingID                ScramblingId,
    periodicityAndOffset        CSI-ResourcePeriodicityAndOffset         OPTIONAL,  -- Cond PeriodicOrSemiPersistent
    qcl-InfoPeriodicCSI-RS      TCI-StateId                              OPTIONAL,  -- Cond Periodic
    ...
}
-- TAG-NZP-CSI-RS-RESOURCE-STOP
-- ASN1STOP
```

FIG. 7B
```
-- ASN1START
-- TAG-NZP-CSI-RS-RESOURCESET-START
NZP-CSI-RS-ResourceSet ::=  SEQUENCE {
    nzp-CSI-ResourceSetId       NZP-CSI-RS-ResourceSetId,
    nzp-CSI-RS-Resources        SEQUENCE (SIZE (1..maxNrofNZP-CSI-RS-ResourcesPerSet)) OF
                                    NZP-CSI-RS-ResourceId,
    repetition                  ENUMERATED { on, off }                   OPTIONAL,  -- Need S
    aperiodicTriggeringOffset   INTEGER(0..6)                            OPTIONAL,  -- Need S
    trs-Info                    ENUMERATED {true}                        OPTIONAL,  -- Need R
    ...
}
-- TAG-NZP-CSI-RS-RESOURCESET-STOP
-- ASN1STOP
```

FIG. 7C
```
-- ASN1START
-- TAG-CSI-RESOURCECONFIG-START
CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList  SEQUENCE (SIZE (1..maxNrofNZP-CSI-RS-ResourceSetsPerConfig)) OF
                                            NZP-CSI-RS-ResourceSetId                                     OPTIONAL,   -- Need R
            csi-SSB-ResourceSetList     SEQUENCE (SIZE (1..maxNrofCSI-SSB-ResourceSetsPerConfig)) OF
                                            CSI-SSB-ResourceSetId                                        OPTIONAL    -- Need R
        },
        csi-IM-ResourceSetList      SEQUENCE (SIZE (1..maxNrofCSI-IM-ResourceSetsPerConfig)) OF CSI-IM-ResourceSetId
    },
    bwp-Id                      BWP-Id,
    resourceType                ENUMERATED { aperiodic, semiPersistent, periodic },
    ...
}
-- TAG-CSI-RESOURCECONFIG-STOP
-- ASN1STOP
```

```
-- ASN1START
-- TAG-CSI-RESOURCEPERIODICITYANDOFFSET-START
CSI-ResourcePeriodicityAndOffset ::=   CHOICE {
    slots4                                  INTEGER (0..3),
    slots5                                  INTEGER (0..4),
    slots8                                  INTEGER (0..7),
    slots10                                 INTEGER (0..9),
    slots16                                 INTEGER (0..15),
    slots20                                 INTEGER (0..19),
    slots32                                 INTEGER (0..31),
    slots40                                 INTEGER (0..39),
    slots64                                 INTEGER (0..63),
    slots80                                 INTEGER (0..79),
    slots160                                INTEGER (0..159),
    slots320                                INTEGER (0..319),
    slots640                                INTEGER (0..639)
}
-- TAG-CSI-RESOURCEPERIODICITYANDOFFSET-STOP
-- ASN1STOP
```

*FIG. 7D*

```
-- ASN1START
-- TAG-CSI-RS-RESOURCEMAPPING-START
CSI-RS-ResourceMapping ::=   SEQUENCE {
    frequencyDomainAllocation         CHOICE {
        row1                                BIT STRING (SIZE (4)),
        row2                                BIT STRING (SIZE (12)),
        row4                                BIT STRING (SIZE (3)),
        other                               BIT STRING (SIZE (6))
    },
    nrofPorts                         ENUMERATED {p1,p2,p4,p8,p12,p16,p24,p32},
    firstOFDMSymbolInTimeDomain       INTEGER (0..13),
    firstOFDMSymbolInTimeDomain2      INTEGER (2..12)                                      OPTIONAL,   -- Need R
    cdm-Type                          ENUMERATED {noCDM, fd-CDM2, cdm4-FD2-TD2, cdm8-FD2-TD4},
    density                           CHOICE {
        dot5                                ENUMERATED {evenPRBs, oddPRBs},
        one                                 NULL,
        three                               NULL,
        spare                               NULL
    },
    freqBand                          CSI-FrequencyOccupation,
    ...
}
-- TAG-CSI-RS-RESOURCEMAPPING-STOP
-- ASN1STOP
```

*FIG. 7E*

```
-- ASN1START
-- TAG-CSI-RS-RESOURCECONFIGMOBILITY-START
CSI-RS-ResourceConfigMobility ::=   SEQUENCE {
    subcarrierSpacing                   SubcarrierSpacing,
    csi-RS-CellList-Mobility            SEQUENCE (SIZE (1..maxNrofCSI-RS-CellsRRM)) OF   CSI-RS-CellMobility,
    ...,
    [[
    refServCellIndex-v1530              ServCellIndex                                       OPTIONAL        -- Need S
    ]]
}

CSI-RS-CellMobility ::=  SEQUENCE {
    cellId                              PhysCellId,
    csi-rs-MeasurementBW                SEQUENCE {
        nrofPRBs                            ENUMERATED { size24, size48, size96, size192, size264},
        startPRB                            INTEGER(0..2169)
    },
    density                             ENUMERATED {d1,d3}                                  OPTIONAL,       -- Need R
    csi-rs-ResourceList-Mobility        SEQUENCE (SIZE (1..maxNrofCSI-RS-ResourcesRRM)) OF CSI-RS-Resource-Mobility
}

CSI-RS-Resource-Mobility ::=    SEQUENCE {
    csi-RS-Index                        CSI-RS-Index,
    slotConfig                          CHOICE {
                                            ms4                         INTEGER (0..31),
                                            ms5                         INTEGER (0..39),
                                            ms10                        INTEGER (0..79),
                                            ms20                        INTEGER (0..159),
                                            ms40                        INTEGER (0..319)
    },
    associatedSSB                       SEQUENCE {
                                            ssb-Index                   SSB-Index,
                                            isQuasiColocated            BOOLEAN
    }                                                                                                       OPTIONAL,   -- Need R
    frequencyDomainAllocation           CHOICE {
                                            row1                        BIT STRING (SIZE (4)),
                                            row2                        BIT STRING (SIZE (12))
    },
    firstOFDMSymbolInTimeDomain         INTEGER (0..13),
    sequenceGenerationConfig            INTEGER (0..1023),
    ...
}

CSI-RS-Index ::=                INTEGER (0..maxNrofCSI-RS-ResourcesRRM-1)
-- TAG-CSI-RS-RESOURCECONFIGMOBILITY-STOP
-- ASN1STOP
```

- Performing synchronization with the network node, in at least one of time and frequency, based on receiving the connected-state RS during the first occasions. — 1360

- Based on receiving the connected-state RS during the first occasions, remaining in a low-power operational mode during one or more second occasions in which non-connected-state RS are transmitted by the network node. — 1370

- Based on determining that the connected-state RS are unavailable during the first occasions, receiving the non-connected-state RS in a non-low-power operational mode during the second occasions. — 1380

- Resuming monitoring SI for a further configuration after expiration of the validity duration. — 1390

- After expiration of a validity duration for the configuration, receiving, from the network node, a further configuration for connected-state RS transmitted by the network node. — 1395

*FIG. 13B*

ADDITIONAL REFERENCE SIGNALS FOR UES IN NON-CONNECTED STATES

TECHNICAL FIELD

The present invention generally relates to wireless communication networks, and particularly relates to reduce energy consumption of wireless devices that are operating in non-connected states in a wireless network.

BACKGROUND

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. While the present disclosure relates primarily to 5G/NR, the following description of fourth-generation Long-Term Evolution (LTE) technology is provided to introduce various terms, concepts, architectures, etc. that are also used in 5G/NR.

LTE is an umbrella term that refers to radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RCC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RCC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure for LTE FDD downlink (DL) operation. The radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary downlink slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth.

An exemplary LTE FDD UL radio frame can be configured in a similar manner as the exemplary FDD DL radio frame shown in FIG. 3. Using terminology consistent with the above DL description, each UL slot consists of $N^{UL}_{symb}$ OFDM symbols, each of which is comprised of $N_{sc}$ OFDM subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz SCS) or 24 (7.5-kHz SCS).

In general, an LTE physical channel corresponds to a set of REs carrying information that originates from higher layers. DL physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY DL includes demodulation reference signals (DM-RS), channel state information RS (CSI-RS), synchronization signals, etc.

PDSCH is used for unicast DL data transmission and also carries random access responses, certain system information blocks (SIBs), and paging information. PBCH carries basic system information required by the UE to access the network. PDCCH is used to transmit DL control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

UL physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the UL counterpart to the PDSCH, used by UEs to transmit UL control information (UCI) including HARQ feedback for eNB DL transmissions, channel quality feedback (e.g., CSI) for the DL channel, scheduling requests (SRs), etc. PRACH is used for random access preamble transmission.

5G/NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some properties similar to a "suspended" condition used in LTE.

In addition to providing coverage via cells, as in LTE, NR networks also provide coverage via "beams." In general, a DL "beam" is a coverage area of a network-transmitted RS that may be measured or monitored by a UE. Such RS can include any of the following, alone or in combination: synchronization signal/PBCH block (SSB), channel state information RS (CSI-RS), tertiary RS (or any other sync signal), positioning RS (PRS), demodulation reference signals (DM-RS), phase-tracking RS (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

In LTE networks, cell reference signals (CRS) are transmitted during every 1-ms subframe by the network and are available to all UEs regardless of RRC state. Although the NR SSB is available to all UEs, it is transmitted much less frequently than LTE CRS, e.g., every 5-160 ms with a default of every 20 ms. This infrequent transmission can create various issues, problems, and/or difficulties for NR UEs operating in a non-connected state, i.e., RRC_IDLE or RRC_INACTIVE.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some embodiments include methods (e.g., procedures) for receiving reference signals (RS) in a wireless network. These exemplary methods can be performed by a user equipment (UE, e.g., wireless device, MTC device, NB-IoT device, modem, etc. or component thereof) in communication with a network node (e.g., base station, eNB, gNB, etc. or component thereof) in the wireless network (e.g., E-UTRAN, NG-RAN).

These exemplary methods can include receiving, from the network node, a configuration for connected-state RS (as defined elsewhere herein) transmitted by the network node. In some embodiments, the configuration can be received while the UE is in the connected state before entering the non-connected state. In some embodiments, the configuration can be received as system information (SI) according to one of the following: broadcast in a cell of the wireless network; or via a unicast message from the network node.

These exemplary methods can also include, while in a non-connected state (as defined elsewhere herein) and based on the received configuration, determining that the connected-state RS will be available during one or more first occasions. These exemplary methods can also include, while in the non-connected state, selectively receiving the connected-state RS during the first occasions. In some embodiments, the connected-state RS can be periodic channel state information RS (CSI-RS) or periodic tracking RS (TRS).

In some embodiments, the selective receiving operations can include: for each first occasion, determining whether reception of the connected-state RS during the first occasion would reduce UE energy consumption; refraining from receiving the connected-state RS during first occasions for which it was determined that reception of the connected-state RS would not reduce UE energy consumption; and receiving the connected-state RS during first occasions for which it was determined that reception of the connected-state RS would reduce UE energy consumption.

In some embodiments, these exemplary methods can also include: based on receiving the connected-state RS during the first occasions, remaining in a low-power operational mode during one or more second occasions in which non-connected-state RS are transmitted by the network node; and, based on determining that the connected-state RS are unavailable during the first occasions, receiving the non-connected-state RS in a non-low-power operational mode during the second occasions.

In some embodiments, the configuration for the connected-state RS includes indications of one or more of the following:
  one or more scrambling codes;
  time and frequency domain resource allocations;
  transmission configuration indicator (TCI) state;
  periodicity of the connected-state RS;
  availability of the connected-state RS while the UE is in a non-connected state;
  a reference time from which the connected-state RS will be available; and
  a validity duration for the configuration.

In some embodiments, the configuration can be received via broadcast system information (SI) while the UE is in the non-connected state. In such embodiments, the reference time can be related to a paging occasion (PO) for the UE.

In some embodiments, the availability of the connected-state RS can be indicated as one of the following with respect to all occasions indicated by the configuration:
  available in all occasions;
  potentially available in all occasions, subject to UE detection in each occasion;
  available in a subset of all occasions, the subset being indicated by the configuration or by layer-1 signaling (e.g., paging DCI) from the network node proximately before each occasion of the subset.

In some embodiments, the occasions can be indicated (i.e., by the configuration) based on one of the following: as absolute timeslot and/or subframe numbers; relative to timing of other signals or channels transmitted or received by the UE; or a parameter input to a function, from which the particular occasions can be determined.

In some embodiments, the occasions can be indicated based on the periodicity of the connected-state RS (e.g., in the configuration) and a subset of the occasions indicated by the periodicity. In some of these embodiments, the periodicity can be indicated based on paging occasions for the UE, and the subset of occasions can be indicated based on a number of consecutive timeslots or a number of milliseconds that immediately precede one of the following: one or more particular paging occasions for the UE, or one or more transmissions of non-connected state RS (e.g., SSB occasions).

In other embodiments, the occasions can be indicated based on a multiple of a periodicity of one of the following: paging occasions for the UE, or transmissions of non-connected-state RS (e.g., SSB occasions). The multiple can be an integer multiple, for example.

In some embodiments, when the configuration indicates potential availability of connected-state RS in all occasions, the determining operations can include detecting the connected-state RS in at least one of the occasions indicated as potentially available.

In some embodiments, determining that the connected-state RS are available during one or more first occasions can be based on a field in paging downlink control information (DCI) detected by the UE during a paging occasion.

In some embodiments, when the configuration includes the validity duration, these exemplary methods can also include, after expiration of the validity duration, receiving, from the network node, a further (e.g., updated) configuration for connected-state RS transmitted by the network node. This further configuration can be received via broadcast or unicast signaling in the same or different manner as the configuration.

In some embodiments, these exemplary methods can include, while in the non-connected state, monitoring broadcast SI for the configuration and, in response to receiving the configuration via the broadcast SI, refraining from monitoring broadcast SI (e.g., for a further or updated configuration) during the validity duration while receiving the connected-state RS. Subsequently, the UE can resume monitoring broadcast SI for the further configuration after expiration of the validity duration.

In some embodiments, the configuration can include first and second scrambling codes. In such embodiments, the first scrambling code can indicate that the connected-state RS will be available for at least a first duration and the second scrambling code can indicate that the connected-state RS will be available for a second duration that is less than the first duration. In various embodiments, the first duration can be one of the following: an amount of time after the current time; an amount of time after the UE enters a non-connected state; or indefinitely after the UE enters a non-connected state. In some embodiments, the configuration can also include the first duration (and, optionally, the second duration).

In some embodiments employing first and second scrambling codes, the selective receiving operations can include: based on detecting the connected-state RS scrambled according to the first scrambling code during one of the first occasions, receiving the connected-state RS until the end of the first duration; and based on detecting the connected-state RS scrambled according to the second scrambling code during one of the first occasions, perform one of the following operations:

attempting to detect the connected-state RS scrambled
according to either the first or second scrambling codes
during a subsequent one of the first occasions, or monitoring broadcast SI for a further configuration for
connected-state RS transmitted by the network node.

In some embodiments, these exemplary methods can also include receiving, from the network node, an activation signal that indicates whether the configuration is activated or deactivated. In such embodiments, determine that the connected-state RS will be available during the first occasions can be further based on the activation signal indicating that the configuration is activated. In various embodiments, the activation signal can be received by the UE in one or more of the following:

the same message as the configuration;
connection release message from the network node while in the connected state;
layer-1 signaling (e.g., paging DCI) from the network node while the UE in the non-connected state; and
SI broadcast in a cell of the wireless network.

In some embodiments, the configuration can be one of a plurality of connected-state RS configurations received by the UE while in the connected state. In such embodiments, the configuration can be activated by the connection release message, or the connection release message can indicate a selection of the configuration from the plurality of connected-state RS configurations.

In some embodiments, the selective receiving operations can include, when the activation signal indicates that the configuration is deactivated, receiving non-connected-state RS instead of the connected-state RS while the UE is in the non-connected state.

In some embodiments, these exemplary methods can also include performing synchronization with the network node, in at least one of time and frequency, based on receiving the connected-state RS during the first timeslots.

Other embodiments include methods (e.g., procedures) for transmitting reference signals (RS) to one or more UEs. These exemplary methods can be performed by a network node (e.g., base station, eNB, gNB, etc., or component thereof) serving a cell in a wireless network (e.g., E-UTRAN, NG-RAN).

These exemplary methods can include transmitting, to one or more UEs, a configuration for connected-state RS transmitted by the network node. In some embodiments, the configuration can be transmitted while the one or more UEs are in the connected state before entering the non-connected state. In some embodiments, the configuration can be transmitted as system information (SI) according to one of the following: broadcast in a cell of the wireless network; or via respective unicast messages to the one or more UEs.

These exemplary methods can also include, while the one or more UEs are in the non-connected state, transmitting the connected-state RS during one or more first occasions associated with the configuration. In some embodiments, the connected-state RS can be periodic channel state information RS (CSI-RS) or periodic tracking RS (TRS).

In some embodiments, these exemplary methods can also include transmitting non-connected state RS during one or more second occasions while the one or more UEs are in the non-connected state. Furthermore, transmitting the connected-state RS during the first timeslots can facilitate the one or more UEs to remain in a low-power operational mode and refrain from receiving the non-connected-state RS during the second occasions.

In some embodiments, the configuration for the connected-state RS includes indications of one or more of the following:

one or more scrambling codes;
time and frequency domain resource allocations;
transmission configuration indicator (TCI) state;
periodicity of the connected-state RS;
availability of the connected-state RS while the one or more UEs are in a non-connected state;
a reference time from which the connected-state RS will be available; and
a validity duration for the configuration.

In some embodiments, the configuration can be transmitted via broadcast system information (SI) while the one or more UEs are in the non-connected state. In such embodiments, the reference time can be related to a paging occasion (PO) for the UEs.

In some embodiments, the availability of the connected-state RS can be indicated as one of the following with respect to all occasions indicated by the configuration:

available in all occasions;
potentially available in all occasions, subject to UE detection in each occasion;
available in a subset of all occasions, the subset being indicated by the configuration or by layer-1 signaling (e.g., paging DCI) from the network node proximately before each occasion of the subset.

In some embodiments, the occasions can be indicated based on one of the following: as absolute timeslot and/or subframe numbers; relative to timing of other signals or channels transmitted or received by the UE; or a parameter input to a function, from which the particular occasions can be determined.

In some embodiments, the occasions can be indicated based on the periodicity of the connected-state RS (e.g., in the configuration) and a subset of the occasions indicated by the periodicity. In some of these embodiments, the periodicity can be indicated based on paging occasions for the UE, and the subset of occasions can be indicated based on a number of consecutive timeslots or a number of milliseconds that immediately precede one of the following: one or more particular paging occasions for the one or more UEs, or one or more transmissions of non-connected state RS.

In other embodiments, the occasions can be indicated based on a multiple of a periodicity of one of the following: paging occasions for the UE, or transmissions of non-connected-state RS.

In some embodiments, these exemplary methods can also include refraining from transmitting the connected-state RS during at least one of the occasions indicated as potentially available (e.g., by the configuration). In other words, the first occasions in which the network node transmits the connected-state RS may be fewer than and/or a subset of the occasions indicated as potentially available.

In some embodiments, when the configuration includes the validity duration, these exemplary methods can also include transmitting, to the one or more UEs after expiration of the validity duration, a further configuration for connected-state RS transmitted by the network node. The further configuration can be transmitted via broadcast or unicast signaling in the same or different manner as the configuration.

In some embodiments, the configuration can include first and second scrambling codes. In such embodiments, the transmitting operations can include: transmitting the connected-state RS scrambled based on the first scrambling code when the connected-state RS will be available for at least a first duration; and transmitting the connected-state RS scrambled based on the second scrambling code when the connected-state RS will be available for a second duration that is less than the first duration. In various embodiments, the first duration can be one of the following: an amount of time after the current time; an amount of time after the one or more UEs enter a non-connected state; or indefinitely after the one or more UEs enter a non-connected state.

In some embodiments, these exemplary methods can also include transmitting, to the one or more UEs, an activation signal that indicates whether the configuration is activated or deactivated. In such embodiments, the connected-state RS can be transmitted during the first occasions based on the activation signal indicating that the configuration is activated.

In various embodiments, the activation signal can be transmitted by the network node in one or more of the following:
  the same message as the configuration;
  a connection release message to a particular one of the UEs, while the particular UE is in the connected state;
  layer-1 signaling (e.g., paging DCI) from the network node while the one or more UEs are in the non-connected state; and
  SI broadcast in a cell of the wireless network.

In some of these embodiments, the configuration can be one of a plurality of connected-state RS configurations transmitted to the one or more UEs while the one or more UEs are in the connected state. In such embodiments, the configuration can be activated by the connection release message, or the connection release message can indicate a selection of the configuration from the plurality of connected-state RS configurations.

In some of these embodiments, the activation signal can be transmitted as a field in paging downlink control information (DCI) during a paging occasion for the one or more UEs.

Other embodiments include UEs (e.g., wireless devices, MTC devices, NB-IoT devices, modems, etc. or components thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes FIGS. 7A-7E, shows various exemplary ASN.1 data structures for message fields and/or information elements (IEs) used to provide CSI-RS resource set configurations to an NR UE.

FIG. 8 shows an exemplary ASN.1 data structure for a CSI-RS-ResourceConfig-Mobility IE, by which an NR network can configure a UE for CSI-RS-based radio resource management (RRM) measurements.

FIGS. 13A-B show a flow diagram of an exemplary method for a UE (e.g., wireless device, MTC device, NB-IoT device, etc.), according to various exemplary embodiments of the present disclosure.

DETAILED DESCRIPTION

Figure 1:
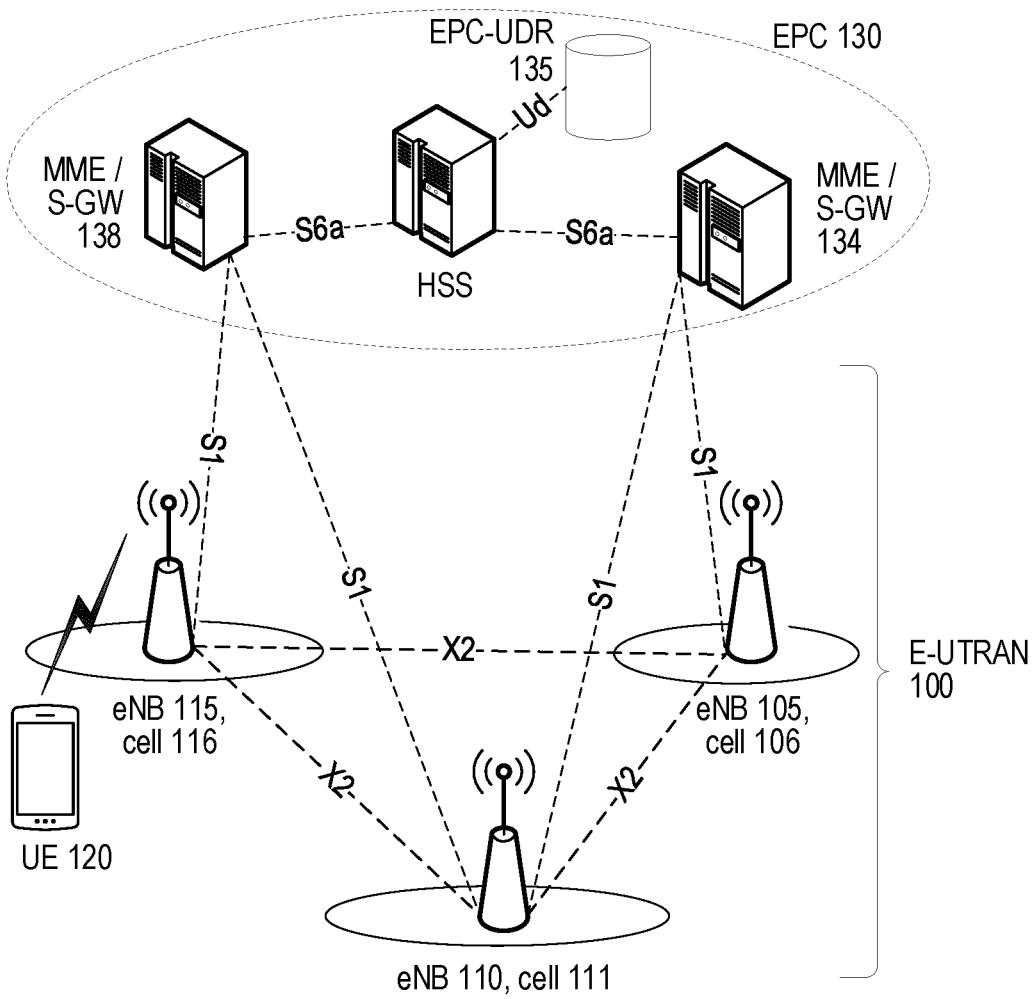
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
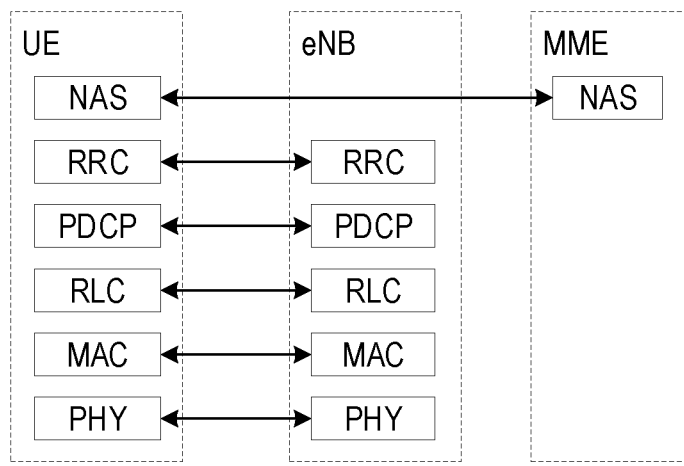
FIG. 2 is a block diagram of exemplary control plane (CP) protocol layers of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, CRS are transmitted during every 1-ms subframe by LTE networks and are available to all UEs in a cell regardless of RRC state. While SSB transmitted by NR networks is available to all UEs, it is transmitted much less frequently than LTE CRS, e.g., every 5-160 ms with a default of every 20 ms. This infrequent transmission can create various issues, problems, and/or difficulties for NR UEs operating in a non-connected state, i.e., RRC_IDLE or RRC_INACTIVE. This is discussed in more detail below after the following discussion of the NR radio interface.

Figure 4:
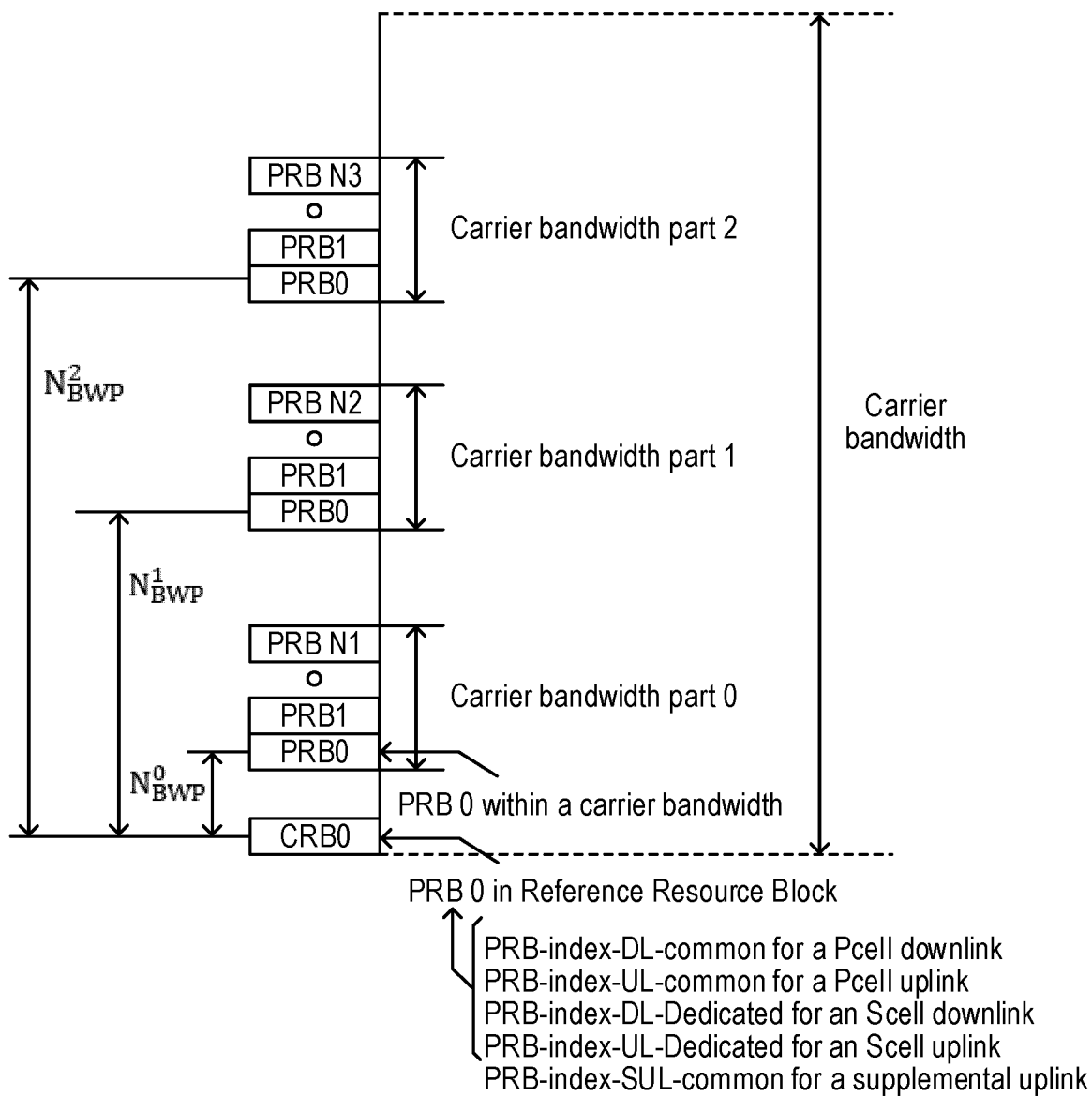
FIG. 4 shows an exemplary frequency-domain configuration for a 5G/New Radio (NR) user equipment (UE).

FIG. 4 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15\times 2^{\mu})$ kHz, where $\mu \in (0, 1, 2, 3, 4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz.

Table 1 below summarizes the supported NR numerologies and associated parameters. Different DL and UL numerologies can be configured by the network.

TABLE 1

| μ | $\Delta f = 2^{\mu} \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 3:
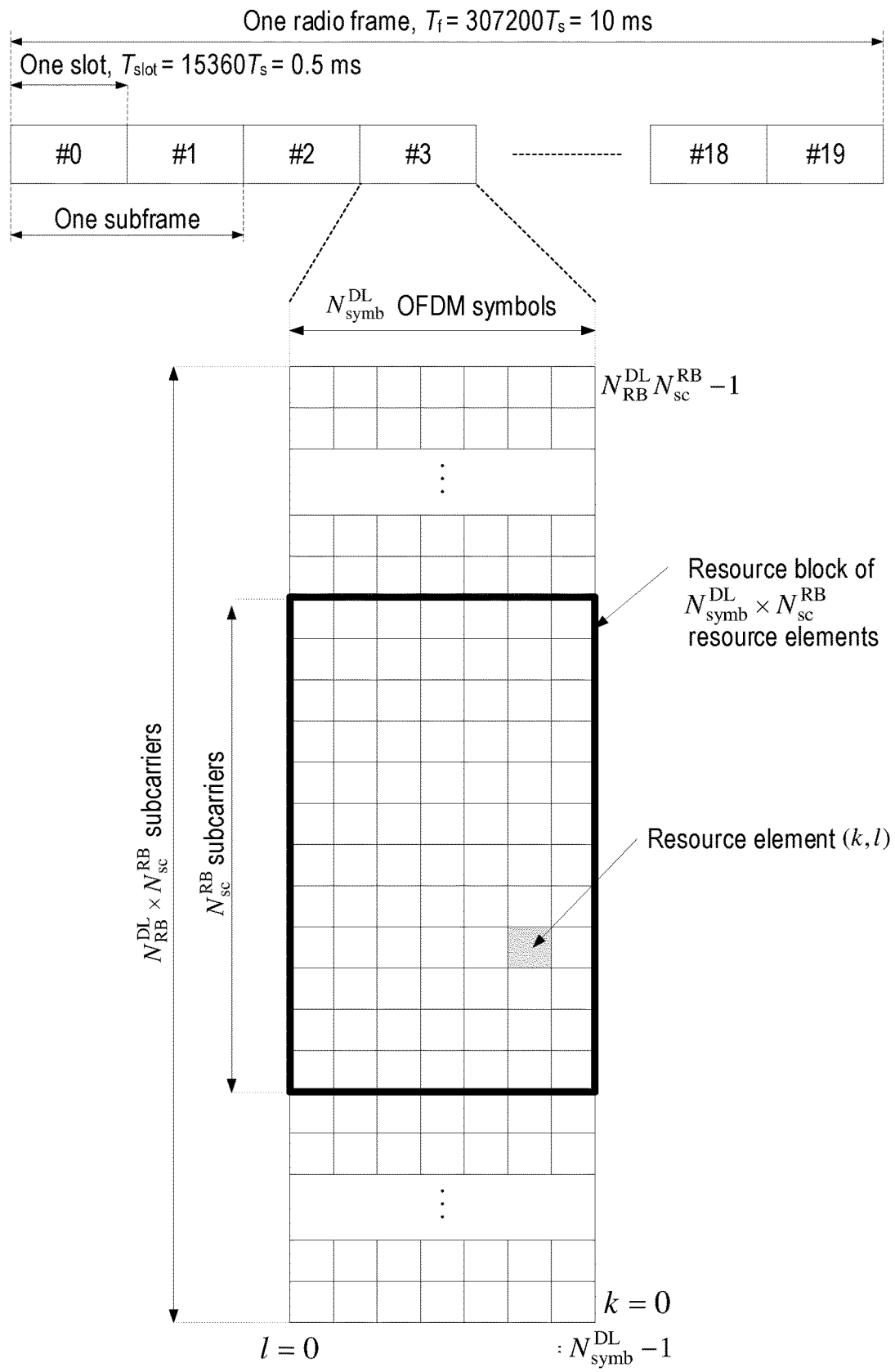
FIG. 3 is a block diagram of an exemplary downlink LTE radio frame structures used for frequency division duplexing (FDD) operation.
Figure 5:
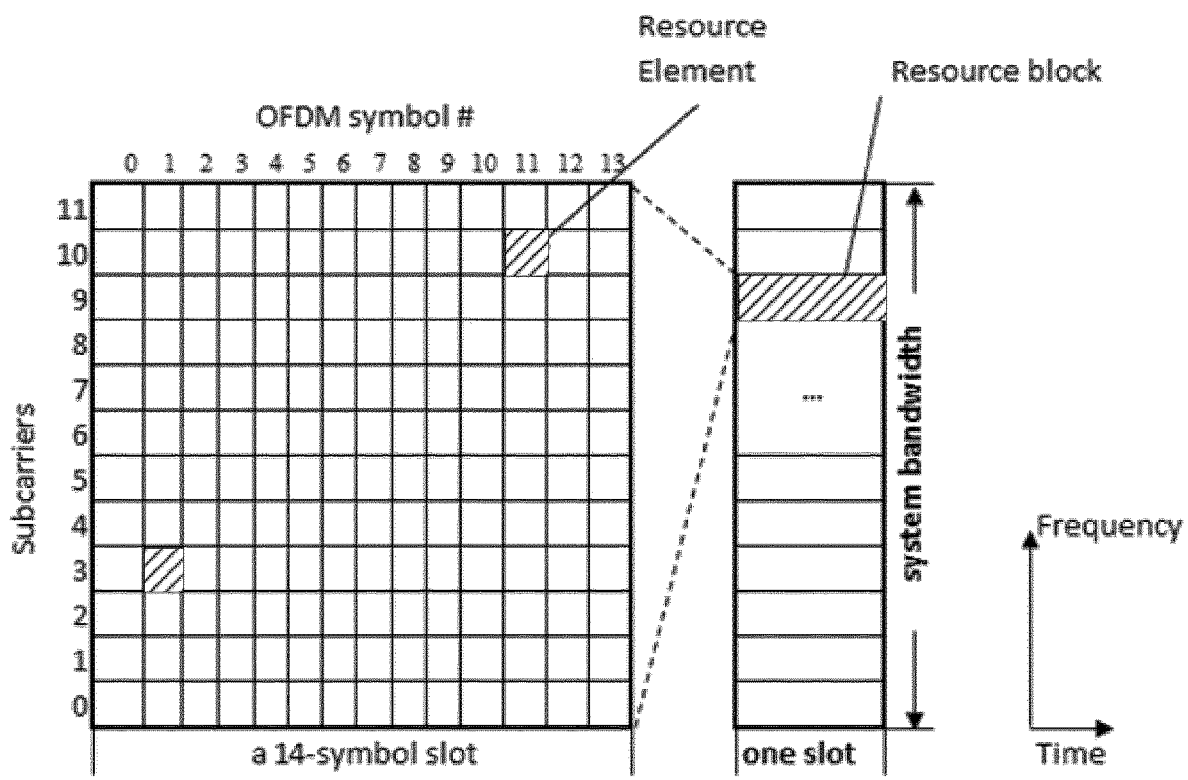
FIG. 5 shows an exemplary time-frequency resource grid for an NR slot.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix (e.g., as shown in FIG. 3) and 12 symbols for extended cyclic prefix.

Figure 6A:
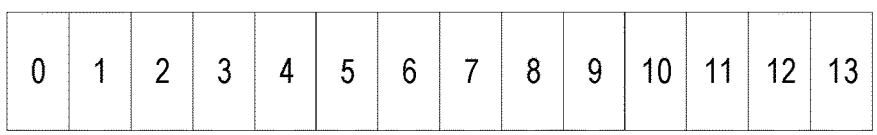
FIGS. 6A-6B show various exemplary NR slot configurations.

FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6B:
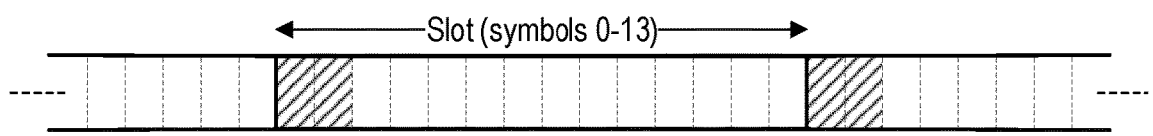

FIG. 6B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe. In NR, however, each REG consists of all 12 REs of one OFDM symbol in a RB, whereas an LTE REG includes only four REs. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single TB transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (v) and the total number of allocated PRBs before rate matching ($n_{PRB}$), the UE determines the Transport Block Size (TBS) for the PDSCH according to the procedure defined in 3GPP TS 38.214 (v 15.0.0) clause 5.1.3.2.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

K0 is part of a PDSCH time-domain resource allocation (TDRA. Also included in the PDSCH TDRA is a slot length indicator value (SLIV) that identifies a particular combination of a starting symbol (S) and a length (L) of the resource allocation. In general, S can be any symbol 0-13 and L can be any number of symbols beginning with S until the end of the slot (i.e., symbol 13). The SLIV can be used as an index to a table of (S, L) combinations. Similarly, K2 is part of a PUSCH TDRA that also includes a corresponding SLIV.

An NR UE can also be configured by the network with one or more NZP (non-zero power) CSI-RS resource set configurations by the higher-layer (e.g., RRC) information elements (IEs) NZP-CSI-RS-Resource, NZP-CSI-RS-ResourceSet. and CSI-ResourceConfig. Exemplary ASN.1 data structures representing these IEs are shown in FIGS. 7A-7C, respectively.

In addition, FIGS. 7D-7E show exemplary ASN.1 data structures representing CSI-ResourcePeriodicityAndOffset and CSI-RS-ResourceMapping fields that are included in the NZP-CSI-RS-Resource IE shown in FIG. 7A. The CSI-ResourcePeriodicityAndOffset field is used to configure a periodicity and a corresponding offset for periodic and semi-persistent CSI resources, and for periodic and semi-persistent CSI reporting on PUCCH. Both periodicity and the offset are given in numbers of slots. For example, periodicity value slots 4 corresponds to four (4) slots, slots 5 corresponds to five (5) slots, etc. The CSI-RS-ResourceMapping field is used to configure the resource element mapping of a CSI-RS resource in time- and frequency domain FIG. 8 shows an exemplary ASN.1 data structure for an RRC CSI-RS-ResourceConfig-Mobility IE, by which an NR network can configure a UE for CSI-RS-based radio resource management (RRM) measurements.

In addition, Tables 2-6 below further define various fields included in respective ASN.1 data structures shown in FIGS. 7A-7C, 7E, and 8. These fields are described in more detail in the discussion that follows the tables.

TABLE 2

| Field Name | Description |
| --- | --- |
| periodicityAndOffset | Periodicity and slot offset sl1 corresponds to a periodicity of 1 slot, sl2 to a periodicity of two slots, and so on. The corresponding offset is also given in number of slots (see 3GPP TS 38.214 clause 5.2.2.3.1). |
| powerControlOffset | Power offset of PDSCH RE to NZP CSI-RS RE. Value in dB (see 3GPP TS 38.214 clauses 5.2.2.3.1 and 4.1). |
| powerControlOffsetSS | Power offset of NZP CSI-RS RE to SS RE. Value in dB (see 3GPP TS 38.214 clause 5.2.2.3.1). |
| qcl-InfoPeriodicCSI-RS | For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the serving cell and to the DL BWP to which the resource belongs to (see 3GPP TS 38.214 clause 5.2.2.3.1). |

TABLE 2-continued

| | Description |
|---|---|
| scramblingID | Scrambling ID (see 3GPP TS 38.214 clause 5.2.2.3.1). |
| resourceMapping | OFDM symbol location(s) in a slot and subcarrier occupancy in a PRB of the CSI-RS resource. |
| Conditional Presence | |
| Periodic | The field is optionally present, Need M, for periodic NZP-CSI-RS-Resources (as indicated in CSI-ResourceConfig). The field is absent otherwise |
| PeriodicOrSemiPersistent | The field is mandatory present, Need M, for periodic and semi-persistent NZP-CSI-RS-Resources (as indicated in CSI-ResourceConfig). The field is absent otherwise. |

TABLE 3

| Field Name | Description |
|---|---|
| aperiodicTriggeringOffset | Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0. |
| nzp-CSI-RS-Resources | NZP-CSI-RS-Resources associated with this NZP-CSI-RS resource set (see 3GPP TS 38.214 clause 5.2). For CSI, there are at most 8 NZP CSI RS resources per resource set |
| repetition | Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see 3GPP TS 38.214 clause 5.2.2.3.1 and 5.1.6.1.2). Can only be configured for CSI-RS resource sets which are associated with CSI-ReportConfig with report of L1 RSRP or "no report" |
| trs-Info | Indicates that the antenna port for all NZP-CSI-RS resources in the CSI-RS resource set is same. If the field is absent or released the UE applies the value "false" (see 3GPP TS 38.214 clause 5.2.2.3.1). |

TABLE 4

| Field Name | Description |
|---|---|
| bwp-Id | The DL BWP which the CSI-RS associated with this CSI-ResourceConfig are located in (see 3GPP TS 38.214 clause 5.2.1.2). |
| csi-ResourceConfigId | Used in CSI-ReportConfig to refer to an instance of CSI-ResourceConfig |
| csi-RS-ResourceSetList | Contains up to maxNrofNZP-CSI-RS-ResourceSetsPerConfig resource sets if ResourceConfigType is 'aperiodic' and 1 otherwise (see 3GPP TS 38.214 clause 5.2.1.2). |
| csi-SSB-ResourceSetList | List of SSB resources used for beam measurement and reporting in a resource set (see 3GPP TS 38.214). |
| resourceType | Time domain behavior of resource configuration (see 3GPP TS 38.214 clause 5.2.1.2). It does not apply to resources provided in the csi-SSB-ResourceSetList. |

TABLE 5

| Field Name | Description |
|---|---|
| cdm-Type | Code division multiplexing (CDM) type (see 3GPP TS 38.214 clause 5.2.2.3.1). |
| density | Density of CSI-RS resource measured in RE/port/PRB (see TS 38.211 [16], clause 7.4.1.5.3). Values 0.5 (dot5), 1 (one) and 3 |

TABLE 5-continued

| Field Name | Description |
| --- | --- |
| | (three) are allowed for X = 1, values 0.5 (dot5) and 1 (one) are allowed for X = 2, 16, 24 and 32, value 1 (one) is allowed for X = 4, 8, 12. For density = ½, includes 1-bit indication for RB level comb offset indicating whether odd or even RBs are occupied by CSI-RS. |
| firstOFDMSymbolIn-TimeDomain2 | Time domain allocation within a physical resource block. See TS 38.211 [16], clause 7.4.1.5.3. |
| firstOFDMSymbolIn-TimeDomain | Time domain allocation within a physical resource block. The field indicates the first OFDM symbol in the PRB used for CSI-RS. See TS 38.211 [16], clause 7.4.1.5.3. Value 2 is supported only when DL-DMRS-typeA-pos equals 3. |
| freqBand | Wideband or partial band CSI-RS, (see TS 38.214 [19], clause 5.2.2.3.1) |
| frequencyDomain-Allocation | Frequency domain allocation within a physical resource block in accordance with TS 38.211 [16], clause 7.4.1.5.3. The applicable row number in table 7.4.1.5.3-1 is determined by the frequencyDomainAllocation for rows 1, 2 and 4, and for other rows by matching the values in the column Ports, Density and CDMtype in table 7.4.1.5.3-1 with the values of nrofPorts, cdm-Type and density below and, when more than one row has the 3 values matching, by selecting the row where the column (k bar, l bar) in table 7.4.1.5.3-1 has indexes for k ranging from 0 to 2*n-1 where n is the number of bits set to 1 in frequencyDomainAllocation. |
| nrofPorts | Number of ports (see TS 38.214 [19], clause 5.2.2.3.1) |

TABLE 6

| Field Name | Description |
| --- | --- |
| csi-rs-ResourceList-Mobility | List of CSI-RS resources for mobility. The maximum number of CSI-RS resources that can be configured per frequency layer depends on the configuration of associatedSSB (see 3GPP TS 38.214 clause 5.1.6.1.3). |
| density | Frequency domain density for the 1-port CSI-RS for L3 mobility Corresponds to L1 parameter 'Density'. |
| nrofPRBs | Allowed size of the measurement BW in PRBs Corresponds to L1 parameter 'CSI-RS-measurementBW-size'. |
| startPRB | Starting PRB index of the measurement bandwidth Corresponds to L1 parameter 'CSI-RS-measurement-BW-start' (see FFS_Spec, section FFS_Section) FFS_Value: Upper edge of value range unclear in RAN1. |
| csi-RS-CellList-Mobility | List of cells |
| refServCellIndex | Indicates the serving cell providing the timing reference for CSI-RS resources without associatedSSB. The field may be present only if there is at least one CSI-RS resource configured without associatedSSB. In case there is at least one CSI-RS resource configured without associatedSSB and this field is absent, the UE shall use the timing of the PCell. The CSI-RS resources and the serving cell indicated by refServCellIndex for timing reference should be located in the same band. |
| subcarrierSpacing | Subcarrier spacing of CSI-RS. Only the values 15, 30 or 60 kHz (<6 GHz), 60 or 120 kHz (>6 GHz) are applicable. |
| associatedSSB | If this field is present, the UE may base the timing of the CSI-RS resource indicated in CSI-RS-Resource-Mobility on the timing of the cell indicated by the cellId in the CSI-RS-CellMobility. In this case, the UE is not required to monitor that CSI-RS resource if the UE cannot detect the SS/PBCH block indicated by this associatedSSB and cellId. If this field is absent, the UE shall base the timing of the CSI-RS resource indicated in CSI-RS-Resource-Mobility on the timing of the serving cell indicated by refServCellIndex. In this case, the UE is required to measure the CSI-RS resource even if SS/PBCH block(s) with cellId in the CSI-RS-CellMobility are not detected. CSI-RS resources with and without associatedSSB may be configured in accordance with the rules in 3GPP TS 38.214 clause 5.1.6.1.3. |
| csi-RS-Index | CSI-RS resource index associated to the CSI-RS resource to be measured (and used for reporting). |
| firstOFDMSymbol-InTimeDomain | Time domain allocation within a physical resource block. The field indicates the first OFDM symbol in the PRB used for CSI-RS, see 3GPP TS 38.211 clause 7.4.1.5.3. Value 2 is supported only when DL-DMRS-typeA-pos equals 3. |

TABLE 6-continued

| Field Name | Description |
| --- | --- |
| frequencyDomain-Allocation | Frequency domain allocation within a physical resource block in accordance with 3GPP TS 38.211 clause 7.4.1.5.3 including table 7.4.1.5.2-1. The number of bits that may be set to one depend on the chosen row in that table. For the choice "other", the row can be determined from the parameters below and from the number of bits set to 1 in frequencyDomainAllocation. |
| isQuasiColocated | The CSI-RS resource is either QCL'd not QCL'd with the associated SSB in spatial parameters (see 3GPP TS 38.214 clause 5.1.6.1.3. |
| sequenceGeneration-Config | Scrambling ID for CSI-RS (see 3GPP TS 38.211 clause 7.4.1.5.2). |
| slotConfig | Indicates the CSI-RS periodicity (in milliseconds) and for each periodicity the offset (in number of slots). When subcarrierSpacingCSI-RS is set to 15 kHZ, the maximum offset values for periodicities ms4/ms5/ms10/ms20/ms40 are 3/4/9/19/39 slots. When subcarrierSpacingCSI-RS is set to 30 kHZ, the maximum offset values for periodicities ms4/ms5/ms10/ms20/ms40 are 7/9/19/39/79 slots. When subcarrierSpacingCSI-RS is set to 60 kHZ, the maximum offset values for periodicities ms4/ms5/ms10/ms20/ms40 are 15/19/39/79/159 slots. When subcarrierSpacingCSI-RS is set 120 kHZ, the maximum offset values for periodicities ms4/ms5/ms10/ms20/ms40 are 31/39/79/159/319 slots. |

Each NZP CSI-RS resource set consists of K≥1 NZP CSI-RS resources. The following parameters are included in the RRC IEs NZP-CSI-RS-Resource, CSI-ResourceConfig, and NZP-CSI-RS-ResourceSet for each CSI-RS resource configuration:

nzp-CSI-RS-ResourceId determines CSI-RS resource configuration identity.

periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.

resourceMapping defines the number of ports, CDM-type, and OFDM symbol and subcarrier occupancy of the CSI-RS resource within a slot that are given in 3GPP TS 38.211 clause 7.4.1.5.

nrofPorts in resourceMapping defines the number of CSI-RS ports, where the allowable values are given in 3GPP TS 38.211 clause 7.4.1.5.

density in resourceMapping defines CSI-RS frequency density of each CSI-RS port per PRB, and CSI-RS PRB offset in case of the density value of ½, where the allowable values are given in 3GPP TS 38.211 clause 7.4.1.5. For density ½, the odd/even PRB allocation indicated in density is with respect to the common resource block grid.

cdm-Type in resourceMapping defines CDM values and pattern, where the allowable values are given in 3GPP TS 38.211 clause 7.4.1.5.

powerControlOffset: the assumed ratio of PDSCH EPRE to NZP CSI-RS EPRE when UE derives CSI feedback and takes values in the range of [−8, 15] dB with 1 dB step size.

powerControlOffsetSS: the assumed ratio of NZP CSI-RS EPRE to SS/PBCH block EPRE.

scramblingID defines scrambling ID of CSI-RS with length of 10 bits.

BWP-Id in CSI-ResourceConfig defines which bandwidth part the configured CSI-RS is located in.

repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Clause 5.1.6.1.2. and can be configured only when the higher layer parameter reportQuantity associated with all the reporting settings linked with the CSI-RS resource set is set to 'cri-RSRP', 'cri-SINR' or 'none'.

qcl-InfoPeriodicCSI-RS contains a reference to a TCI-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP.

trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same as described in Clause 5.1.6.1.1 and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement. Furthermore, the UE expects that all the CSI-RS resources of a resource set are configured with the same starting RB and number of RBs and the same cdm-type.

The bandwidth and initial common resource block (CRB) index of a CSI-RS resource within a BWP, as defined in 3GPP TS 38.211 clause 7.4.1.5, are determined based on the RRC-configured parameters nrofRBs and startingRB, respectively, within the CSI-FrequencyOccupation IE configured by the RRC parameter freqBand within the CSI-RS-ResourceMapping IE. Both nrofRBs and startingRB are configured as integer multiples of four (4) RBs, and the reference point for startingRB is CRB 0 on the common resource block grid. If startingRB<$N_{BWP}^{start}$, the UE shall assume that the initial CRB index of the CSI-RS resource is $N_{initial\ RB}$=$N_{BWP}^{start}$, otherwise $N_{initial\ RB}$=startingRB. If nrofRBs>$N_{BWP}^{size}$+$N_{BWP}^{start}$−$N_{initial\ RB}$, the UE assumes that the bandwidth of the CSI-RS resource is $N_{CSI-RS}^{BW}$=$N_{BWP}^{size}$+$N_{BWP}^{start}$−$N_{initial\ RB}$. Otherwise, the UE assumes that $N_{CSI-RS}^{BW}$=nrofRBs. In all cases, the UE expects that $N_{CSI-RS}^{BW} \geq \min(24, N_{BWP}^{size})$.

A UE in RRC_CONNECTED state receives from the network (e.g., via RRC) a UE-specific configuration of a NZP-CSI-RS-ResourceSet including the parameter trs-Info, described in the parameter list above. For NZP-CSI-RS-ResourceSet configured with the RRC parameter trs-Info set to "true", the UE shall assume the antenna port with the same port index of the configured NZP CSI-RS resources in the NZP-CSI-RS-ResourceSet is the same.

For frequency range 1 (FR1, e.g., sub-6 GHz), the UE may be configured with one or more NZP CSI-RS sets, where a NZP-CSI-RS-ResourceSet consists of four periodic NZP CSI-RS resources in two consecutive slots with two periodic NZP CSI-RS resources in each slot. If no two consecutive slots are indicated as DL slots by tdd-UL-DL-ConfigurationCommon or tdd-UL-DL-ConfigDedicated, then the UE may be configured with one or more NZP CSI-RS sets, where a NZP-CSI-RS-ResourceSet consists of two periodic NZP CSI-RS resources in one slot.

For frequency range 2 (FR2, e.g., above 6 GHz), the UE may be configured with one or more NZP CSI-RS sets, where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

In addition, a UE configured with NZP-CSI-RS-ResourceSet(s) including parameter trs-Info may have the CSI-RS resources configured as periodic, with all CSI-RS resources in the NZP-CSI-RS-ResourceSet configured with same periodicity, bandwidth and subcarrier location. As a second option, a UE configured with NZP-CSI-RS-ResourceSet(s) including parameter trs-Info may be configured with periodic CSI-RS resource in one set and aperiodic CSI-RS resources in a second set, with the aperiodic CSI-RS and periodic CSI-RS resource having the same bandwidth (with same RB location) and the aperiodic CSI-RS being "QCL-Type-A" and "QCL-TypeD" (where applicable) with respect to the periodic CSI-RS resources.

In this second option, for FR2, the UE expects that the scheduling offset between the last symbol of the PDCCH carrying the triggering DCI and the first symbol of the aperiodic CSI-RS resources is not smaller than the UE reported ThresholdSched-Offset. The UE shall expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggeringOffset indicates the triggering offset for the first slot for the first two CSI-RS resources in the set.

In addition, the UE expects not to be configured with any of the following:
   a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured';
   a CSI-ReportConfig with the higher layer parameter reportQuantity set to other than 'none' for aperiodic NZP CSI-RS resource set configured with trs-Info;
   a CSI-ReportConfig for periodic NZP CSI-RS resource set configured with trs-Info; or
   a NZP-CSI-RS-ResourceSet configured both with trs-Info and repetition.

In addition, according to 3GPP TS 38.211 clause 7.4.1.5.3, each CSI-RS resource is configured by the higher layer parameter NZP-CSI-RS-Resource with the following restrictions:
   the time-domain locations of the two CSI-RS resources in a slot, or of the four CSI-RS resources in two consecutive slots (which are the same across two consecutive slots), as defined by higher layer parameter CSI-RS-resourceMapping, is given by:
      $l \in \{4,8\}$, $l \in \{5,9\}$, or $l \in \{6,10\}$ for FR1 and FR2; or
      $l \in \{0,4\}$, $l \in \{1,5\}$, $l \in \{2,6\}$, $l \in \{0,7\}$, $l \in \{7,11\}$, $l \in \{8,12\}$ or $l \in \{9,13\}$ for FR2.
   a single port CSI-RS resource with density $\rho=3$ given by 3GPP TS 38.211 Table 7.4.1.5.3-1 and parameter density configured by CSI-RS-ResourceMapping.
   the bandwidth of the CSI-RS resource, as given by the parameterfreqBand configured by CSI-RS-ResourceMapping, is the minimum of 52 and $N_{BWP,i}^{size}$ RBs, or is equal to $N_{BWP,i}^{size}$ RBs. For operation with shared spectrum channel access, freqBand configured by CSI-RS-ResourceMapping, is the minimum of 48 and $N_{BWP,i}^{size}$, RBs, or is equal to $N_{BWP,i}^{size}$ RBs.
   the UE is not expected to be configured with the periodicity of $2^\mu \times 10$ slots if the bandwidth of CSI-RS resource is larger than 52 RBs.
   the periodicity and slot offset for periodic NZP CSI-RS resources, as given by the parameter periodicityAndOffset configured by NZP-CSI-RS-Resource, is one of $2^\mu X_p$ slots where $X_p$=10, 20, 40, or 80 and where $\mu$ is the numerology of the BWP.
   same powerControlOffset and powerControlOffsetSS given by NZP-CSI-RS-Resource value across all resources.

In NR, a UE in RRC_CONNECTED state is provided with periodic, semi-periodic, and/or aperiodic CSI-RS/TRS, which are also referred to as "tracking reference signals" (TRS) or "CSI RS for tracking." The UE uses these RS to measure channel quality and/or to adjust the UE's time and frequency synchronization with the UE's serving network node (e.g., gNB). When a particular UE transitions to a non-connected state (i.e., RRC_IDLE or RRC_INACTIVE), the network may or may not turn off such RSs for that particular UE. Nevertheless, the non-connected UE is not aware of whether the connected-state RS are also available in the non-connected state. As such, the UE in a non-connected state conventionally relies on SSB measurements for synchronization, tuning of the receiver automatic gain control (AGC), and/or cell quality measurements (e.g., for RRM).

As briefly mentioned above, however, SSB transmitted much less frequently than LTE CRS, e.g., every 5-160 ms with a default of every 20 ms. After a UE looks for a paging message from the network in a regularly-scheduled paging occasion (PO), the UE prefers to return to deep sleep in order to reduce energy consumption. However, the UE may need to refrain from going into a deep sleep after a PO in order to wait for the next SSB, which can be a considerable amount of time relative to the time spent looking for the paging message. These operations can lead to increased energy consumption, decreased time between battery charges, and/or unavailability of UE-stored energy for other purposes, such as data services.

Accordingly, exemplary embodiments of the present disclosure mitigate, reduce, and/or eliminate these and other exemplary problems, issues, and/or drawbacks by providing a flexible mechanism for a network node (e.g., gNB) in a wireless network (e.g., NG-RAN) to inform served UEs about presence/absence and/or configuration of non-SSB RS available to the UE in a non-connected state (i.e., RRC_IDLE or RRC_INACTIVE), particularly non-SSB RS (e.g., CSI-RS, TRS) that are normally available only to UEs in RRC_CONNECTED state.

As used herein, a "connected-state RS" is a RS that is conventionally and/or normally available to a UE only while the UE is in RRC_CONNECTED state (or a state with similar properties) with an active connection to the network. In other words, in conventional operation, a connected-state RS is not available to a UE while the UE is in a non-connected state (e.g., RRC_IDLE, RRC_INACTIVE, or a state with similar properties) without an active connection to the network. Examples of connected-state RS include CSI-RS, TRS, etc. As such, after UE is informed about the presence and/or configuration of these connected-state RS and enters a non-connected state, the UE can determine particular timeslots in which the connected-state RS are present, and receive the connected-state RS accordingly.

These embodiments can provide various exemplary advantages and/or benefits when employed in UEs and wireless networks. For example, such embodiments can facilitate reduced UE energy consumption while allowing the UE to maintain synchronization and/or AGC while in a non-connected state. This can be done by enabling the UE to receive and/or measure connected-state RS in a non-connected state, such that the UE does not have to enter (or remain in) a normal (i.e., non-low-power) operational mode to receive non-connected-state RS (e.g., SSB) to use for similar purposes. Conversely, when such connected-state RS are not available to the non-connected UE, the UE may need to return to the non-low-power operational mode to receive non-connected-state RS. Furthermore, embodiments can provide such advantages without requiring additional types of RS than what the network already transmits to UEs in RRC_CONNECTED state (e.g., TRS/CSI-RS for tracking).

At a high level, embodiments can address various aspects, including the following enumerated aspects:

1. Network provisioning of connected-state RS (e.g., non-SSB) configuration information to the UE either via system information blocks (SIBs) or dedicated RRC signaling, as well as corresponding UE monitoring of non-SSB RS presence while in non-connected state (i.e., RRC_IDLE or RRC_INACTIVE).
2. Network indicating activation/deactivation of connected-state RS in UE non-connected states via PBCH, e.g., using broadcast master information block (MIB).
3. Network indicating activation/deactivation of connected-state RS in UE non-connected states via DCI-based signaling, e.g., via paging DCI.
4. Network indicating activation/deactivation of connected-state RS in UE non-connected states using RRC connection release signaling.
5. UE provisioning of assistance information regarding the UE's capability to receive connected-state RS in UE non-connected states, with network provisioning responsive to UE capabilities.
6. Network providing an indication about condition(s) under which a UE may assume presence of non-SSB RS in one or more occasions. The condition(s) can be indicated by a flag, with the indicated condition(s) being one or more of the following: static, paging-occasion (PO) based, paging DCI based, blind-detection based, etc.

According to embodiments of the first aspect, the configuration of one or more TRS may be provided using SI signaling, e.g., in SIBs. As such, TRS configuration parameters (e.g., scrambling code, time and frequency domain allocation, TCI state, periodicity, etc.) are communicated through SIB1, SIB2, etc. This can be either based on association of a number of CSI-RS resources, or an independent compact TRS configuration in SI.

In some embodiments, the network can indicate in the configuration that the TRS is present or absent in UE non-connected state. In such embodiments, the presence indication may be a separate flag or implicit based on the configuration info being included in SI. The UE may configure its receiver to utilize the TRS if the SI indicates TRS presence, either explicitly or implicitly. In the present disclosure, the terms "presence," "activated," and "available" are used synonymously with respect to TRS; likewise, the terms "absence," "deactivated," and "unavailable" are used synonymously.

In some embodiment, the configuration can include multiple scrambling codes, e.g., code 1 and code 2 for TRS. In one example, a TRS transmitted with code 1 can indicate that the TRS is available for at least a first duration, including during the non-connected state. The first duration can be a validity duration for the configuration, which may be included in the configuration, provided/received by another means (e.g., SI, DCI, etc.), or pre-configured (e.g., specified in a 3GPP specification). For example, the validity duration can be relative to the current time, relative to another transmission event, indefinitely, etc.

In contrast, TRS transmitted with code 2 may indicate that the TRS is present during a second duration that is less than the first duration. In some embodiments, code 2 can indicate that the TRS is absent during the non-connected state; in which case, the second duration is zero. Alternately, the second duration can be a non-zero duration. The second duration may be included in the configuration, provided/received by another means (e.g., SI, DCI, etc.), or pre-configured (e.g., specified in a 3GPP specification). In some embodiments, code 2 can indicate that the TRS is not guaranteed to remain present after the validity duration (e.g., after a timer expires and in this case the timer is expected to work in a shorter term than code 1). In some embodiments, the particular code 1 and code 2 can be pre-configured (e.g., specified in a 3GPP specification) rather than being explicitly indicated in the configuration.

In some embodiments, when the UE detects a TRS with code 1 while in non-connected state, it may initiate or continue utilizing the TRS in at the current and/or subsequent TRS occasions, for the validity duration of the configuration, and may perform another TRS detection during that time. When the UE detects a TRS with code 2, it may continue utilizing the TRS at the current TRS occasion and may start monitoring broadcast SI or attempt layer 1 (L1) detection in the allocated time-frequency resources using code 2 (i.e., assuming the current TRS presence continues) or code 1 (i.e., assuming a new TRS presence begins).

In some embodiments, the configuration can include a validity duration to indicate a duration for which UE can assume TRS are present (e.g., according to the configuration) after UE enters a non-connected state. The validity duration can be applicable for a single TRS configuration or for multiple TRS configurations. Furthermore, in the case of multiple TRS configurations, each can have an associated validity duration applicable only to that particular configuration. For TRS configurations having multiple scrambling codes, each scrambling code can be associated with a validity duration, such as the first duration and the second duration for codes 1 and 2 discussed above. In some embodiments, the validity duration can be indicated as a timer value, which the UE can use to initiate a timer that expires at the end of the validity duration.

In some embodiments, the network can indicate whether it supports transmission of connected-state RS in UE non-connected states by whether or not it includes a configuration of such connected-state RS in SI provided to the UE via broadcast or unicast signaling. For example, if the network does not include such a configuration in broadcast SI for a cell, UEs can interpret this as an indication that the network does not support transmission of connected-state RS to UEs non-connected states. This indication can be particularly relevant when the network does not actively inform non-connected UEs about relevant SI changes (e.g., via paging, as done for SIB1 changes).

Figure 9:
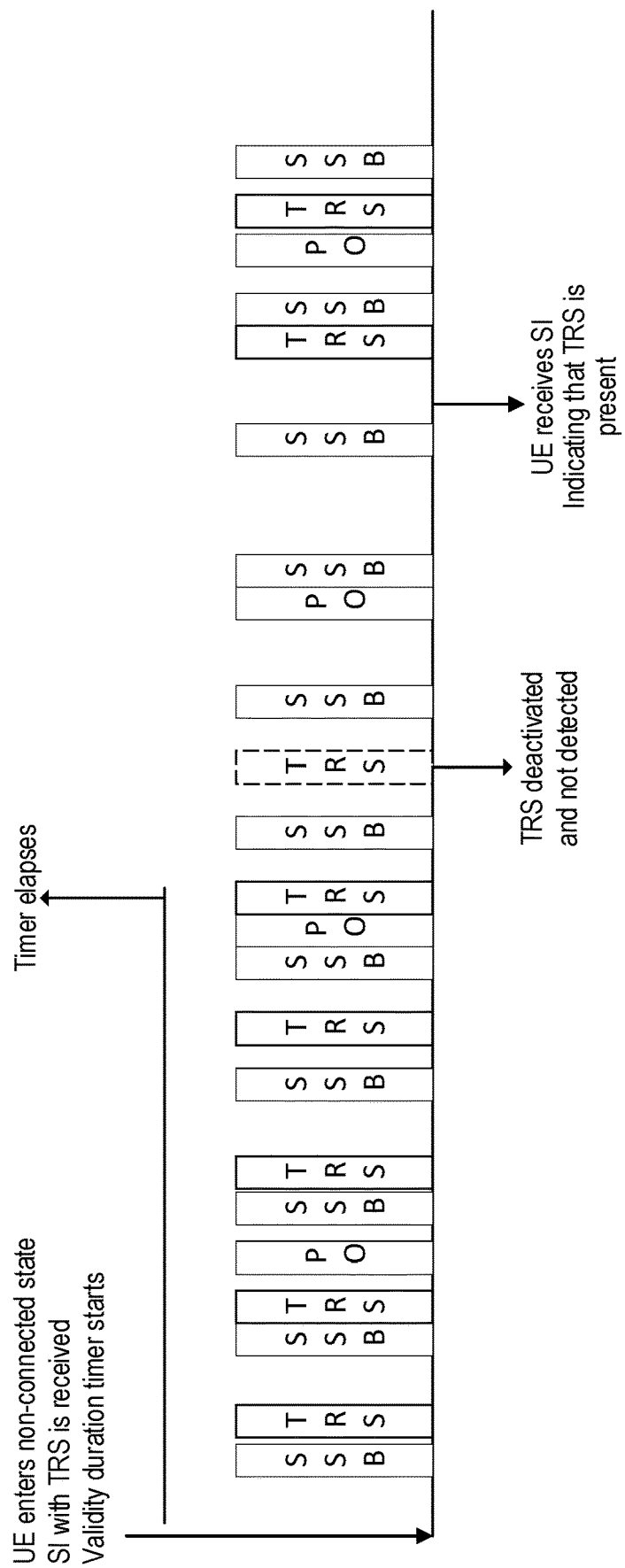
FIG. 9 shows an exemplary timeline illustrating UE detection of connected-state RS during non-connected-state operation, according to various exemplary embodiments of the present disclosure.

FIG. 9 shows an exemplary timeline illustrating UE detection of connected-state RS during non-connected-state operation, according to various exemplary embodiments of the present disclosure. In this exemplary timeline, the UE enters the non-connected state and receives SI with a TRS configuration, including a validity duration for the configuration. In this case, the validity duration is an amount of time after the UE enters the non-connected state. The UE starts a validity duration timer based on the indicated validity duration. During the validity duration, the UE can receive TRS according to the previously received configuration. Moreover, the UE can refrain from receiving other RS (e.g., non-connected-state RS such as SSB) in order to remain in sleep longer and decrease energy consumption.

After the UE's validity duration timer expires, the UE attempts to detect TRS in an expected TRS occasion according to the configuration. However, the TRS has been deactivated and the UE does not detect it. After some time, the UE receives SI indicating that the connected-state RS (e.g., TRS) has been activated again. The SI can also indicate that the previous configuration is applicable again, or the SI can provide a further configuration that is applicable to subsequent transmissions of the connected-state RS (including a new validity duration). Subsequently, the UE can receive TRS according to the re-activated configuration or the activated further configuration.

In some embodiments, after the validity duration expires, the UE can determine presence/absence of the connected-state RS via direct detection (e.g., using a correlator receiver). For example, such embodiments can be beneficial when the network does not transmit SI indicating the re-activated configuration or an activated further configuration.

In some embodiments, the network can indicate one or more occasions during which the connected-state RS will be available. For example, the network can indicate timeslots and/or subframes, e.g., using absolute numbers with respect to the network time base. As a more specific example, the network can indicate that a TRS will be available until mod(SFN,10)=0, where SFN is the subframe number associated with the network node's transmissions.

Alternately, the occasions can be indicated in relation to other events from which the UEs can derive timing, e.g., relative to one or more paging occasions (POs), SSB transmissions, Remaining Minimum System Information (RMSI), PRACH occasions, etc. For example, the occasions can be indicated via a parameter, Z, which is input to a function known both to the network and UEs. For example, the parameter Z can indicate that the particular occasions include all SFNs that satisfy the function mod(SFN, Z)=0. Multiple Z values may be provided. For SFNs that do not satisfy the function, the UE can remain asleep or it can receive non-connected mode RS (e.g., SSB) instead of connected-state RS.

In one embodiment, the network can inform non-connected state UEs about changes in TRS configurations (e.g., broadcast in SI) through an SI update mechanism, such as via UE paging. Alternatively, the network may not actively inform UEs about changes in TRS configurations via the SI update mechanism, and instead let UE determine any SI changes based on monitoring the relevant SIB in the broadcast SI. In some embodiments, the network can include, in the SI, an indication of whether changes in TRS configurations are indicated via the SI update mechanism.

If a TRS configuration change triggers the SI update mechanism, the UE monitors the relevant SIB in the broadcast SI and, when found, receives the updated TRS configuration and/or the updated activation/deactivation status of the current TRS configuration. In some embodiments, if the UE has not received an SI update signal (e.g., via paging) for a predetermined time, the UE may also read the current SI without receiving an SI update signal.

If general, if the SI update mechanism is not used, the UE may periodically or occasionally monitor the broadcast SI to determine the activation/deactivation status of the current TRS configuration and/or the availability of a new TRS configuration. In some embodiments, the UE may determine whether to monitor SI for this purpose by comparing the additional energy spent for SI reception to energy saved by utilizing the TRS, and monitoring SI only when the overall energy usage is lower, e.g., by an amount that exceeds a predetermined threshold.

In any event, upon obtaining a revised activation/deactivation status of the current TRS configuration and/or a new TRS configuration, the UE adapts the TRS utilization strategy (e.g., whether to utilize TRS in addition to or instead of SSB, or use SSBs only) to match the obtained information. Put differently, based on the received configuration, the UE can determine one or more timeslots during which the connected-state RS will be available, and determines whether to receive the connected-state RS in those timeslots instead of or in addition to receiving non-connected-state RS (e.g., SSB). These determinations can be based on relative energy consumption for the various operational options. In other words, the UE can receive available connected-state RS during timeslots for which reception of the connected-state RS would reduce UE energy consumption, and refrain from receiving available connected-state RS during timeslots for which reception of the connected-state RS would not reduce UE energy consumption.

In some embodiments, the network can indicate the availability of TRS/CSI-RS in a subset of all occasions associated with a periodicity of the TRS/CSI-RS. Currently, TRS/CSI-RS can be transmitted in bursts with a periodicity of 10 ms, 20 ms, 40 ms or 80 ms. For example, the network may indicate that TRS is available in the X SFNs immediately preceding one or more paging occasions for a UE. The network can include X in the configuration, or in other SI. For example, X=1 or 2 can be sufficient in some cases such as FR1 operation. In other embodiments, the network can indicate a subset of all occasions associated with a periodicity via a parameter Y, which indicates that the UE can expect RS transmissions in SFNs satisfying SFN mod Y=x, where x is 0 or can also be indicated by the network node.

Such indications can allow a network to transmit TRS/CSI-RS only when needed, though in case of large number of UEs, the network may end up transmitting TRS/CSI-RS in most, if not all, possible occasions. Even so, these embodiments allow the network to reduce unnecessary transmission of TRS/CSI-RS for non-connected state UEs without using SI updates to indicate deactivation of certain TRS/CSI-RS transmissions.

Figure 10:
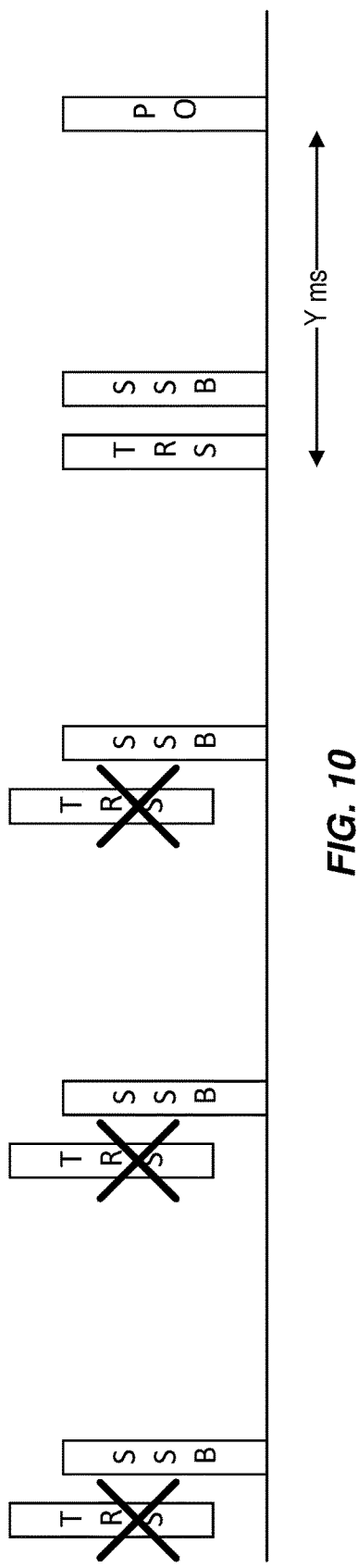
FIG. 10 shows a timeline illustrating exemplary transmission of TRS relative to SSB and UE paging occasions (POs), according to various exemplary embodiments of the present disclosure.

In other embodiments, the network may indicate that TRS/CSI-RS are available in the Y milliseconds immediately preceding one or more paging occasions for a UE. FIG. 10 shows a timeline illustrating exemplary transmission of TRS relative to SSB and UE paging occasions (POs), according to various exemplary embodiments of the present disclosure. In FIG. 10, the X's indicate periodic TRS/CSI-RS occasions indicated via SI, but where UE cannot assume transmission of TRS/CSI-RS. In contrast, the UE can assume presence of TRS/CSI-RS during the Y ms immediately preceding the UE's next paging occasion. Similarly, the network can indicate TRS/CSI-RS availability relative to SSB transmissions (also referred to as SMTC occasions).

In other embodiments, the network can explicitly indicate the occasions where TRS/CSI-RS is transmitted. For example, this can be done by not including a periodicity component in the TRS/CSI-RS configuration and/or by directly indicating that the periodicity of the TRS/CSI-RS occasions is based on the periodicity of the paging occasions (e.g., that TRS periodicity is an integer multiple of the paging occasion periodicity. The network may additionally indicate TRS/CSI-RS occasions via an offset (e.g., ms, slots, symbols) relative to paging occasions. The network may also indicate the offset relative to SSB occasions (e.g., most recent SSB occasion before paging frame). For example, if the network indicates the additional offset, the UE may ignore the periodicity component in the TRS/CSI-RS configuration and use the offset to identify the TRS/CSI-RS occasions. For example, the UE can receive the TRS in conjunction with particular paging or SSB occasions, based on the directly or indirectly obtained offset info between the TRS and the respective paging or SSB occasions.

In general, a UE receiving a TRS (e.g., during a particular occasion or timeslot) can include evaluating whether measuring or detecting or otherwise receiving the TRS is beneficial (e.g., for synchronization), and refraining from receiving the TRS if the evaluation indicates a lack of benefits.

In some embodiments, the network may activate TRS in a cell with a first (shorter) period when connected UEs are present, and with a second (longer) period equal to the paging frame interval when no connected-mode UEs are present in the cell.

In case of other non-connected mode RS (e.g., RS other than SSB), the network may further decide to only include configuration related to periodic RSs in SI and exclude configurations for semi-persistent or aperiodic RS from the SI. Alternatively, configuration related to semi-persistent RSs may also be included in SI.

In some embodiments, the network may decide to transmit TRS for UEs in non-connected states, until one or a specific number of UEs still remain in connected state. In a related realization, the network may refrain from transmitting TRS for UEs in non-connected states idle when a first number of UEs (e.g., including all) are in non-connected states. This criterion can be expressed equivalently as a second number of UEs (e.g., including zero) are in the connected state.

In some embodiments, when a UE is in a non-connected state, the UE receives SI broadcast in a cell, where the SI includes the configuration for the connected-state RS. As mentioned above, the configuration information can include a validity duration that indicates a time duration for which a UE can assume transmission of the connected-state RS according to the configuration. The indicated validity duration can be relative to a reference time, such as a paging frame, a paging occasion, a SFN, etc. In some embodiments, the configuration can include the reference time. The validity duration can be indicated in units of slots, subframes, frames, milliseconds, etc.

In some embodiments, a UE may check for a TRS configuration in SI (e.g., broadcast SI). If a TRS configuration is found, the UE can utilize TRS for non-connected state activities beginning at the UE's next PO, continue monitoring for TRS presence based on L1 detection, and refrain from monitoring SI for further TRS configuration information. In some variants, the UE determines TRS presence from L1 based detection solutions in the upcoming TRS occasion and starts utilizing it from the upcoming PO instance. The UE may perform L1 detection of TRS with a given resource set, e.g., by correlating the received signal in specified time/frequency (T/F) locations with the specified TRS code contents. For example, if TRS with Code 1 is found in L1 detection and a validity duration is indicated to the UE in the SI, the UE obtains information that, at least for the validity duration, the detected TRS with Code 1 will be present in non-connected state. The UE will then perform no SI monitoring but can continues utilization of TRS during the validity duration (e.g., for synchronization/AGC purposes). Alternatively, if Code 2 is detected, the UE obtains information that TRS may be deactivated either immediately or after a specific time. The UE may continue utilizing TRS during the remaining time, and after that the UE resumes monitoring SI for TRS configuration or presence update, or attempts to detect a TRS with Code 1. In another example, the UE does not to monitor SI if TRS is detected, e.g., based on the latest TRS configuration, but if not detected, the UE resumes SI monitoring.

According to embodiments of the second aspect, after a UE has received one or more TRS configurations either through broadcast SI or unicast (e.g., dedicated RRC) signaling, the network can activate and deactivate a particular TRS configuration via one or more bits broadcast in the SI. For example, the one or more bits can be included in a master information block (MIB) of the broadcast SI, which can be transmitted on PBCH in a cell. For example, a bit value 1 indicates that the TRS is transmitted for non-connected state UEs, and a bit value 0 indicates that the TRS is not transmitted and/or its presence should not be assumed by non-connected state UEs. In other embodiments, a bit value 1 indicates a first TRS configuration is activated and a second TRS configuration is deactivated, while a bit value 0 indicates that the first TRS configuration is deactivated and the second TRS configuration is activated. An application delay can be associated with a change in the bit value from 1 to 0, or vice versa.

In some embodiments, the SI may also include a validity duration for the presence bit in PBCH, allowing the UE to avoid very frequent PBCH/MIB reading. The UE may then read the PBCH, obtain TRS presence status info and validity duration, start or continue TRS utilization (if present), and read the PBCH bit again after expiration of the validity duration. Alternatively, the network may indicate particular PBCH occasions where the activation/deactivation bit is provided. This can be indicated by a periodicity in terms of SFNs, SSB occasions, POs, etc. This can also be indicated by a time (e.g., ms) between each PBCH relative to a reference time, a number of ms before a PO, or a number of SSBs before a PO, etc.

Figure 11:
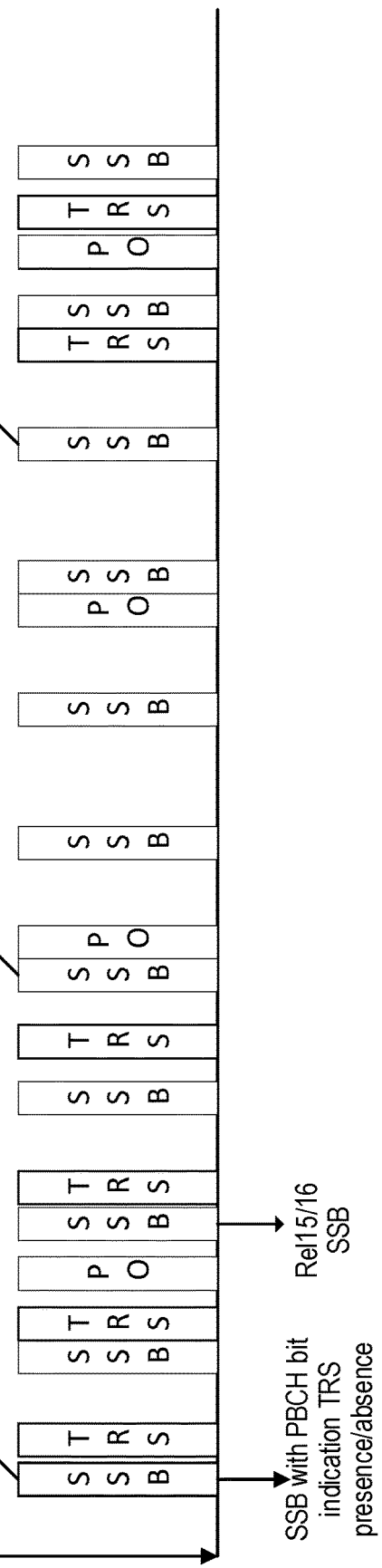
FIGS. 11-12 show two exemplary timelines illustrating techniques for network indication of presence/absence of connected-state RS during UE non-connected-state operation, according to various exemplary embodiments of the present disclosure.

FIG. 11 shows an exemplary timeline illustrating a PBCH-based technique for network indication of presence/absence of connected-state RS during UE non-connected-state operation, according to various exemplary embodiments of the present disclosure. As shown in FIG. 11, the UE enters a non-connected state (e.g., RRC_IDLE or RRC_INACTIVE) and receives a TRS configuration from higher layer signaling (e.g., broadcast SI). The configuration can include an indication of one or more PBCH occasions that include an indication of the presence/absence of TRS transmissions corresponding to the received TRS configuration. The PBCH occasions are included in the SSB occasions shown in FIG. 11. A first one of the PBCH occasions includes an indication that the TRS transmissions are present in one or more subsequent TRS occasions, e.g., until the next PBCH occasion. The UE reads the presence indication and subsequently receives the TRS in one or more of the four subsequent TRS occasions.

A second one of the PBCH occasions includes an indication that the TRS transmissions are absent in one or more subsequent TRS occasions. The UE reads the absence indication and then refrains from receiving the TRS in the subsequent TRS occasions. A third one of the PBCH occasions includes an indication that the TRS transmissions are present in one or more subsequent TRS occasions. The UE reads the PBCH presence indication and subsequently receives the TRS in one or more of the two subsequent TRS occasions shown in the figure.

According to embodiments of the third aspect, after a UE has received one or more TRS configurations either through broadcast SI or unicast (e.g., dedicated RRC) signaling, the network can activate and deactivate a particular TRS configuration via one or more bits in a paging message (e.g., DCI) directed to the UE. For example, DCI format 1-0 with CRC scrambled by Paging RNTI (P-RNTI) can be used for including an indication of activation/deactivation of TRS transmissions according to the received configuration. The activation/deactivation indication may be included in paging DCI transmitted as part of regular network operation and/or in paging messages transmitted in response to change of TRS in broadcast SI.

As mentioned above, a DCI format 1_0 with CRC scrambled by P-RNTI can be used to convey the activation/deactivation indication for the TRS configuration. As described in more detail in 3GPP TS 38.214, DCI format 1_0 includes an 8-bit field that is reserved unconditionally, as well as several other fields having bits that are occupied in certain conditions and reserved in certain other conditions. One or more of these conditionally or unconditionally reserved fields can be used to carry the activation/deactivation indication for previously provided TRS configuration.

Other fields in DCI format 1_0 can include unused values, even if all bits in the field are needed to convey the range of used values. For example, the modulation and coding scheme (MCS) index can include five (5) bits, which can indicate a total of 32 values. However, some of those 32 values may be unused, reserved, and/or invalid. Such values can be repurposed to indicate activation/deactivation of a TRS configuration. In some cases, the activation/deactivation of TRS may apply only to the UEs with the same PO, or the UEs which are paged in that specific PO, or all the UEs.

In other embodiments, a bit field in paging DCI, or a combination of reference to invalid indices (e.g., MCS) may indicate activation or deactivation of a specific TRS configuration. For example, if two TRS configurations are provided, a two-bit field can be employed, with a first bit indicating activation/deactivation of a first configuration and a second bit indicating activation/deactivation of a second configuration. Specific values of the respective bits can be assigned to activation or deactivation status as needed or desired.

In another embodiment, the network may only provide TRS activation/deactivation indications in paging DCI only when it is actually paging the UE, and otherwise forego sending such indications. For example, E.g., the network may sending a paging DCI within a PO that activates TRS when at least one UE is paged in that PO, and then the TRS activation is valid until a specific time and/or according to a specific condition (e.g., until the UE is in a specific cell). After the activation becomes invalid, the UE will need to detect if TRS is present or absent, and the network will only send another activation/deactivation indication in a subsequent PO in which at least one UE needs to be paged.

In some embodiments, the network may indicate a specific application delay within which the current activated/deactivated state remains as it is. This application delay can be configured based on a timer in terms of ms, SSB occasions, SFNs, or POs.

Figure 12:
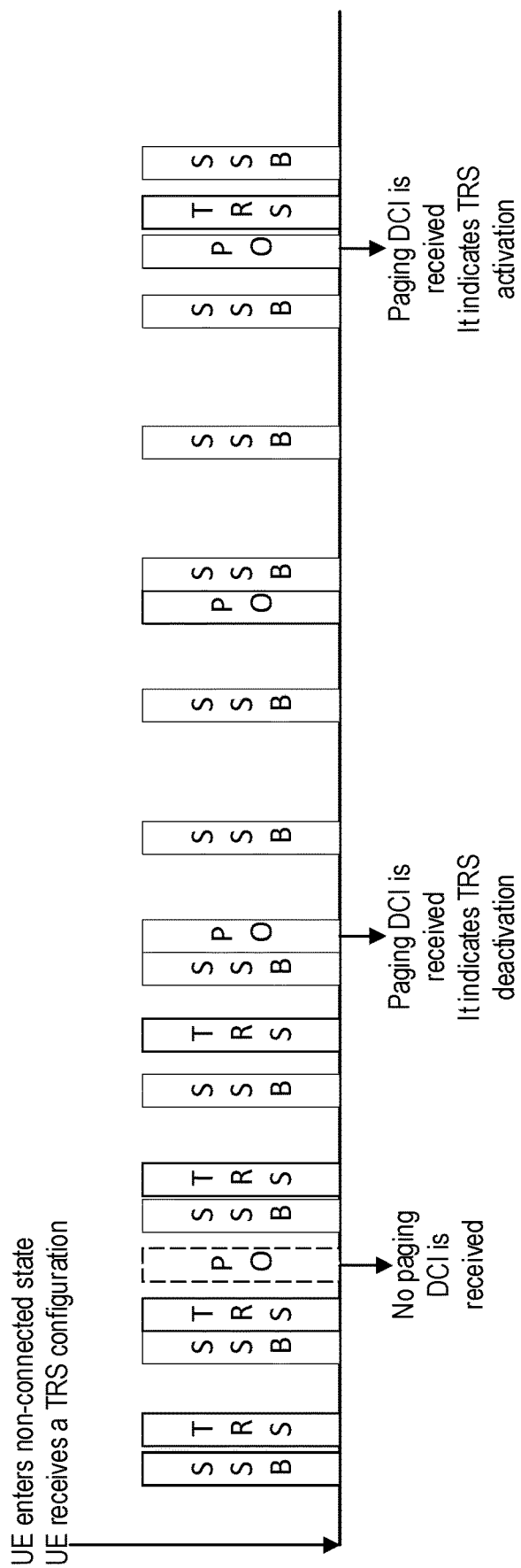

FIG. 12 shows an exemplary timeline illustrating a paging-based technique for network indication of presence/absence of connected-state RS during UE non-connected-state operation, according to various exemplary embodiments of the present disclosure. Similar to the scenario shown in FIG. 11, the UE enters a non-connected state (e.g., RRC_IDLE or RRC_INACTIVE) and receives a TRS configuration from higher layer signaling (e.g., broadcast SI). The TRS configuration can be activated or deactivated by default or by an indication in the configuration itself. During a first paging occasion (PO) for the UE, the UE monitors PDCCH for a paging DCI scrambled by P-RNTI but does not detect such a paging DCI that includes the activation/deactivation indication. Until the next PO, the UE proceeds according to the current state of the TRS configuration.

During a second PO for the UE, the UE monitors PDCCH for a paging DCI scrambled by P-RNTI and detects such a paging DCI that includes an indication that the TRS configuration is deactivated. Until the next PO, the UE proceeds according to the deactivated state of the TRS configuration, e.g., by refraining from detecting transmitted TRS and/or receiving non-connected state RS such as SSB, as needed. For example, if UE is paged every 1.28 s, then the UE can assume that TRS is absent in all TRS occasions until the next PO. Alternately, the UE can attempt to detect TRS in these TRS occasions, based on the assumption that TRS may be present even if not guaranteed to be present.

During a third PO for the UE, the UE monitors PDCCH for a paging DCI scrambled by P-RNTI and detects such a paging DCI that includes an indication that the TRS configuration is activated. For example, if UE is paged every 1.28 s, then the UE can assume that TRS is present in all TRS occasions until the next PO. Until the next PO, the UE proceeds according to the activated state of the TRS configuration, e.g., by receiving transmitted TRS and/or refraining from receiving non-connected state RS such as SSB. For example, during this period, the UE can remain in sleep state for extended period, thereby reducing energy consumption.

In other embodiments, the TRS availability duration after the paging DCI can be independent of the POs and indicated by higher-layer signaling, e.g., as part of the configuration. For example, if the TRS availability duration Y=1.28 s, the UE can assume TRS is present for the next 1.28 s. In another embodiment, the TRS availability duration can be indicated by a combination of higher-layer signaling and an indication via the paging DCI. For example, the configuration can include TRS availability duration values Y0=[TRS not available], Y1=1.28 s, Y2=4.96 s, Y3=10.24 s. Two bits in the paging DCI can select one of these four values. The availability duration values can also be indicated in units of slots, subframes, or frames.

In some embodiments, rather than repurposing reserved fields, the DCI format 1_0 can be augmented with an additional field used to convey the activation/deactivation indication for the TRS configuration. For example, a TRS/CSI-RS presence indication (Y) field can be included when a TRS/CSI-RS configuration is included in broadcast SI, and can be omitted when such a configuration is not included in broadcast SI. An exemplary Y field can be two (2) bits in length, with the four possible values corresponding to the exemplary conditions indicated in Table 7 below.

TABLE 7

| Y value | Condition |
| --- | --- |
| 00 | No TRS/CSI-RS transmission available (deactivated) |
| 01 | TRS/CSI-RS is transmitted for time duration Y1 (in ms), Y1 indicated by higher layer signaling |
| 10 | TRS/CSI-RS is transmitted for time duration Y2 (in ms), Y2 indicated by higher layer signaling |
| 11 | TRS/CSI-RS is transmitted for time duration Y3 (in ms), Y3 indicated by higher layer signaling |

In some embodiments, the network may decide to activate TRS (or a specific TRS configuration) for UEs in non-connected states, until one or a specific number of UEs still remain in connected state. In a related realization, the network may refrain from activating TRS for UEs in non-connected states idle when a first number of UEs (e.g., including all) are in non-connected states. This criterion can be expressed equivalently as a second number of UEs (e.g., including zero) are in the connected state.

According to embodiments of the fourth aspect, after a UE has received one or more TRS configurations either through broadcast SI or unicast (e.g., dedicated RRC) signaling, the network can indicate presence/absence of one or more of the received TRS configurations in a connection release message to the UE. Examples of connection release messages include RRCConnectionRelease (LTE) and RRCRelease message (NR), which instruct the UE to release the connection and transition to RRC_IDLE state. Another example of a connection release message is RRCRelease with suspend indication (NR), which instructs the UE to transition to an RRC_INACTIVE state.

In some embodiments, the network can include in the connection release message one or more additional TRS configurations, i.e., that the UE did not receive earlier. The network can also indicate whether one of these additional configurations are activated. In some embodiments, the network can include in the connection release message a validity duration for any activated TRS configurations, such as discussed above in relation to other embodiments. In some embodiments, the network can also indicate specific times during which the TRS configuration is activated, such as in relation to one or more POs for the UE, similar to other embodiments discussed above. In general, any of the configuration- or activation/deactivation-related information disclosed above as (optionally) being included in a configuration transmitted/received via broadcast SI or unicast signaling (e.g., dedicated RRC), can also be included in the connection release message.

Embodiments based on a connection release message can also be combined with other embodiments discussed above. For example, the network can indicate that a TRS configuration is activated in UE non-connected state for a validity duration via connection release message, and after the validity duration expires, the UE can monitor SI or paging DCIs for further TRS activation/deactivation indications. If the connection release message does not include a validity duration for the activated configuration, the UE can monitor SI or paging DCIs periodically, or as needed. Alternately or in addition, the UE may use L1 detection to determine the TRS presence after the validity duration. Regardless of how the UE determines TRS presence/absence, the UE adapts TRS utilization (and corresponding energy consumption reduction strategies) accordingly.

According to embodiments of the fifth aspect, the UE can provide assistance information to the network in terms of UE capability for using TRS or any other connected-state RS during a non-connected state, e.g., for energy consumption reduction. The network can selectively provide the network with the TRS configurations and/or activation/deactivation indications, in any manner discussed above, based on the UE's capability to utilize TRS in a non-connected state.

In some embodiments, if the UE indicates that it is capable for using TRS in such a manner, the UE may also provide more detailed assistance information such as preferred TRS configuration(s). For example, the UE may indicate a preferred TRS configuration with minimum periodicity (e.g., 10 ms) to achieve power savings, or it may indicate multiple preferred TRS configurations with different periodicities, offsets, preferred T/F resources, specific occasions (e.g., before some or all POs), etc.

According to embodiments of the sixth aspect, a UE in a non-connected state can receive configuration information related to the connected-state RS (e.g., TRS) via system information (SI) for a cell (e.g., SIBx). The SI can include an indication of a condition under which a UE may assume availability of the connected-state RS during one or more occasions while the UE is in the non-connected state. The UE determines when the indicated condition is met and then receives the connected-state RS according to the configuration. Four exemplary conditions are listed below. In such case, the condition indication can be a two-bit field (or flag) that selects one of the four conditions below.

Static occasions—Indicating that the TRS/CSI-RS is available in all TRS occasions indicated by the TRS/CSI-RS configuration.

PO-based TRS/CSI-RS Occasions—TRS/CSI-RS is available in a subset of TRS/CSI-RS occasions indicated by the TRS configuration in the system information. Additional configuration information is included in the system information to indicate the subset of TRS occasions. For example, the UE may assume TRS/CSI-RS is present in certain TRS/CSI-RS occasions relative to paging occasions. Additional details relevant to this mode is listed in Aspects (1-4) above.

DCI-based occasions—TRS/CSI-RS is available in a subset of TRS/CSI-RS occasions indicated by the TRS configuration in the system information. Additional configuration information is included in the system information and an indication in a DCI (e.g., paging DCI) to indicate the subset of TRS occasions. For example, the UE may assume TRS/CSI-RS is present in certain TRS/CSI-RS occasions based on the indication within a detected paging DCI.

Potential occasions—TRS is potentially available in the TRS occasions indicated by the TRS/CSI-RS configuration and the UE may check during each occasion (as needed) by blind detection or other means to determine if the TRS is present.

The embodiments described above can be further illustrated with reference to FIGS. 13-14, which show exemplary methods (e.g., procedures) performed by UEs and network nodes, to respectively. Put differently, various features of the operations described below correspond to various embodiments described above. Furthermore, the exemplary methods shown in FIG. 13-14 can be used cooperatively to provide various exemplary benefits and/or advantages described herein. Although FIGS. 13-14 show specific blocks in particular orders, the operations of the exemplary methods can be performed in different orders than shown and can be combined and/or divided into blocks with different functionality than shown. Optional blocks or operations are indicated by dashed lines.

Figure 13A:
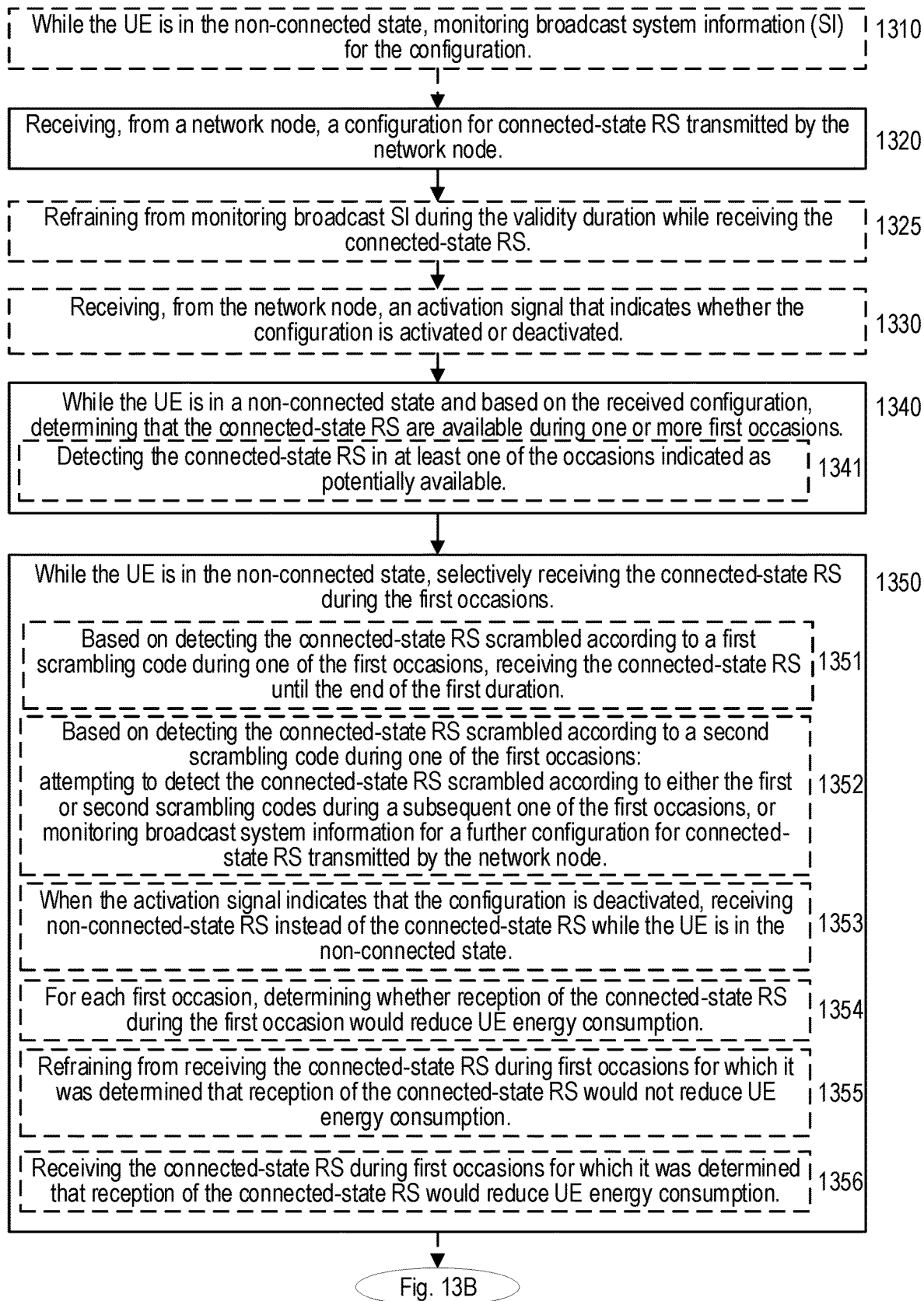
Figure 14:
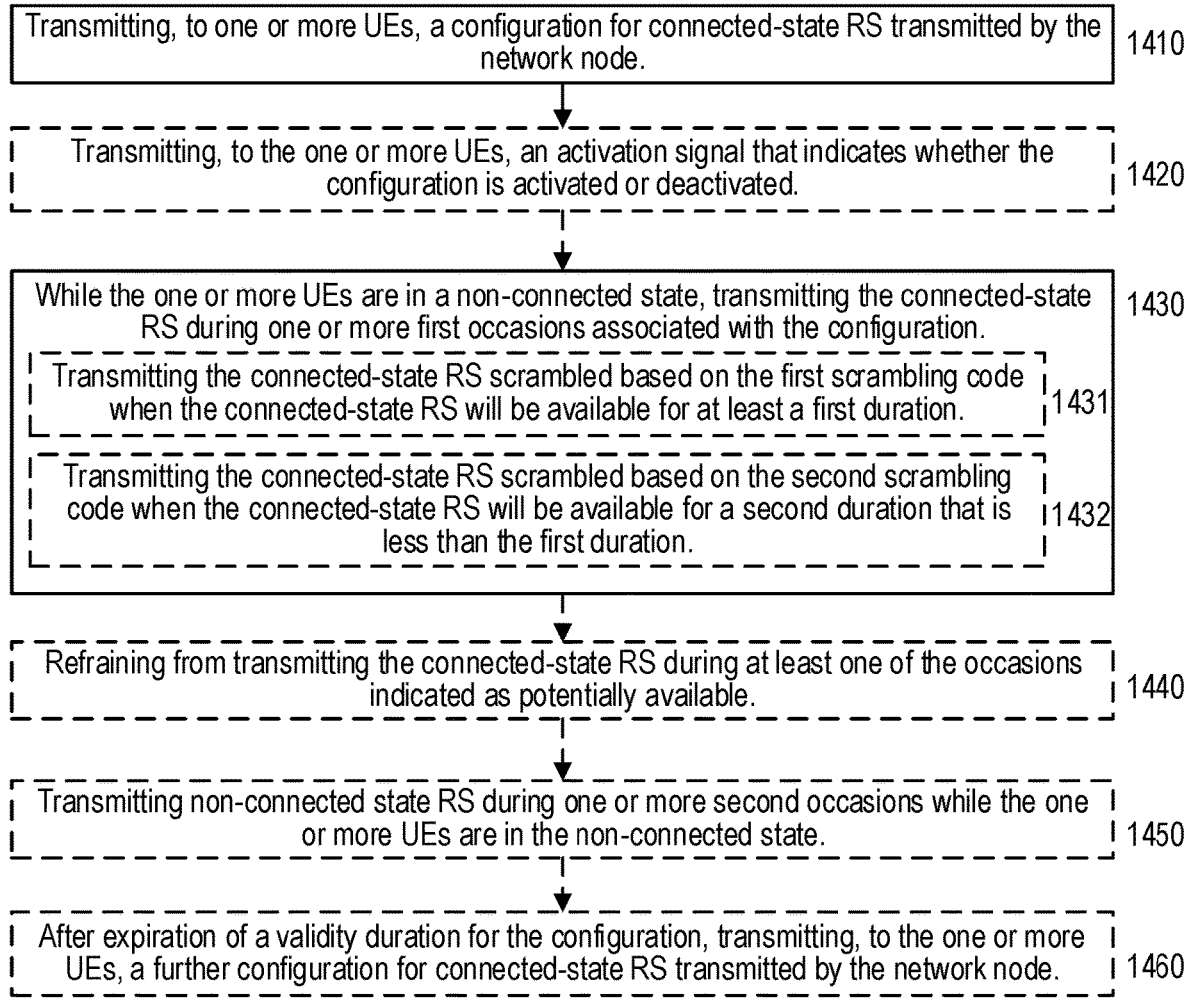
FIG. 14 shows a flow diagram of an exemplary method for a network node (e.g., base station, eNB, gNB, etc.) in a wireless network, according to various exemplary embodiments of the present disclosure.

In particular, FIG. 13 (which includes FIGS. 13A-B) shows a flow diagram of an exemplary method (e.g., procedure) for receiving reference signals (RS) transmitted by a network node in a wireless network, according to various exemplary embodiments of the present disclosure. The exemplary method can be performed by a UE (e.g., wireless device, MTC device, NB-IoT device, modem, etc. or component thereof), such as a UE configured according to other figures described herein.

The exemplary method can include the operations of block 1320, where the UE can receive, from the network node, a configuration for connected-state RS (as defined elsewhere herein) transmitted by the network node. In some embodiments, the configuration can be received while the UE is in the connected state before entering the non-connected state. In some embodiments, the configuration can be received as system information (SI) according to one of the following: broadcast in a cell of the wireless network; or via a unicast message from the network node.

The exemplary method can also include the operations of block 1340, where the UE can, while a non-connected state (as defined elsewhere herein) and based on the received configuration, determine that the connected-state RS will be available during one or more first occasions (e.g., timeslots). Note that the first occasions can be some or all of the occasions indicated by the received configuration.

The exemplary method can also include the operations of block 1350, where the UE can, while in the non-connected state, selectively receive the connected-state RS during the first occasions. In some embodiments, the connected-state RS can be periodic channel state information RS (CSI-RS) or periodic tracking RS (TRS). Note it is not necessary that the UE receive the connected-state RS during the entire first occasions; rather the UE may receive the connected-state RS during some portion of each of the first occasions (e.g., one or more symbols of a timeslot).

In some embodiments, the selective receiving operations of block 1350 can include the operations of sub-blocks 1354-1356. In sub-block 1354, the UE can, for each first occasion, determine whether reception of the connected-state RS during the first occasion would reduce UE energy consumption. In sub-block 1355, the UE can refrain from receiving the connected-state RS during first occasions for which it was determined (i.e., in sub-block 1354) that reception of the connected-state RS would not reduce UE energy consumption. In sub-block 1356, the UE can receive the connected-state RS during first occasions for which it was determined that reception of the connected-state RS would reduce UE energy consumption.

In some embodiments, the exemplary method can also include the operations of blocks 1370-1380. In block 1370, the UE can, based on receiving the connected-state RS during the first occasions, remain in a low-power operational mode during one or more second occasions in which non-connected-state RS are transmitted by the network node. In block 1380, based on determining that the connected-state RS are unavailable during the first occasions, the UE can receive the non-connected-state RS in a non-low-power operational mode during the second occasions. In such embodiments, the determination result of block 1380 can be the alternative outcome to the determination result of block 1340.

In some embodiments, the configuration for the connected-state RS can include indications of one or more of the following:
- one or more scrambling codes;
- time and frequency domain resource allocations;
- transmission configuration indicator (TCI) state;
- periodicity of the connected-state RS;
- availability of the connected-state RS while the UE is in a non-connected state;
- a reference time from which the connected-state RS will be available; and
- a validity duration for the configuration.

In some embodiments, the configuration can be received via broadcast system information (SI) while the UE is in the non-connected state. In such embodiments, the reference time can be related to a paging occasion (PO) for the UE.

In some embodiments, the availability of the connected-state RS can be indicated as one of the following with respect to all occasions indicated by the configuration:
- available in all occasions;
- potentially available in all occasions, subject to UE detection in each occasion;
- available in a subset of all occasions, the subset being indicated by the configuration or by layer-1 signaling (e.g., paging DCI) from the network node proximately before each occasion of the subset.

In some embodiments, the occasions can be indicated (i.e., by the configuration) based on one of the following: as absolute timeslot and/or subframe numbers; relative to timing of other signals or channels transmitted or received by the UE; or a parameter input to a function, from which the particular occasions can be determined.

In some embodiments, the occasions can be indicated based on the periodicity of the connected-state RS (e.g., in the received configuration) and a subset of the occasions indicated by the periodicity. In some of these embodiments, the periodicity can be indicated based on paging occasions for the UE, and the subset of occasions can be indicated based on a number of consecutive timeslots or a number of milliseconds that immediately precede one of the following: one or more particular paging occasions for the UE, or one or more transmissions of non-connected state RS (e.g., SSB occasions).

In other embodiments, the occasions can be indicated based on a multiple of a periodicity of one of the following: paging occasions for the UE, or transmissions of non-connected-state RS (e.g., SSB occasions). The multiple can be an integer multiple, for example.

In some embodiments, when the configuration indicates potential availability of connected-state RS in all occasions, the determining operations of block 1340 can include the operations of sub-block 1341, where the UE can detect the connected-state RS in at least one of the occasions indicated as potentially available.

In some embodiments, determining that the connected-state RS are available during one or more first occasions (e.g., in block 1340) can be based on a field in paging downlink control information (DCI) detected by the UE during a paging occasion.

In some embodiments, when the configuration includes the validity duration, the exemplary method can also include the operations of block 1395 where after expiration of the validity duration, the UE can receive, from the network node, a further (e.g., updated) configuration for connected-state RS transmitted by the network node. This further configuration can be received via broadcast or unicast signaling, as described above, in the same or a different manner than the configuration received in block 1320.

In some of these embodiments, the exemplary method can also include the operations of blocks 1310, 1325, and 1390. In block 1310, the UE can, while in the non-connected state, monitor broadcast system information (SI) for the configuration. In block 1325, the UE can, in response to receiving the configuration via the broadcast SI (e.g., in block 1320), refrain from monitoring broadcast SI (e.g., for the further configuration) during the validity duration while receiving the connected-state RS. In block 1390, the UE can resume monitoring SI for the further configuration after expiration of the validity duration.

In some embodiments, the configuration (e.g., received in block 1320) can include first and second scrambling codes. In such embodiments, the first scrambling code indicates that the connected-state RS will be available for at least a first duration and the second scrambling code indicates that the connected-state RS will be available for a second duration that is less than the first duration. In various embodiments, the first duration can be one of the following: an amount of time after the current time; an amount of time after the UE enters a non-connected state; or indefinitely after the UE enters a non-connected state. In some embodiments, the configuration can also include the first duration (and, optionally, the second duration).

In some embodiments employing first and second scrambling codes, the selective receiving operations of block 1350 can include the operations of sub-blocks 1351-1352. In sub-block 1351, based on detecting the connected-state RS scrambled according to the first scrambling code during one of the first occasions, the UE can receive the connected-state RS until the end of the first duration. In sub-block 1352, based on detecting the connected-state RS scrambled according to the second scrambling code during one of the first occasions, the UE can perform one of the following operations: attempting to detect the connected-state RS scrambled according to either the first or second scrambling codes during a subsequent one of the first occasions, or monitoring broadcast SI for a further configuration for connected-state RS transmitted by the network node.

In some embodiments, the exemplary method can also include the operations of block 1330, where the UE can receive, from the network node, an activation signal that indicates whether the configuration is activated or deactivated. In such embodiments, the determining operations of block 1340 can be further based on the activation signal indicating that the configuration is activated. In various embodiments, the activation signal can be received by the UE in one or more of the following:
the same message as the configuration (e.g., in block 1320);
connection release message from the network node while in the connected state;
layer-1 signaling (e.g., paging DCI) from the network node while the UE in the non-connected state; and
SI broadcast in a cell of the wireless network.

In some embodiments, the configuration can be one of a plurality of connected-state RS configurations received by the UE while in the connected state. In such embodiments, the configuration can be activated by the connection release message (mentioned above), or the connection release message can indicate a selection of the configuration from the plurality of connected-state RS configurations.

In some embodiments, the selective receiving operations of block 1350 can include the operations of sub-block 1353, where the UE can, when the activation signal (e.g., block 1330) indicates that the configuration is deactivated, receive non-connected-state RS instead of the connected-state RS while the UE is in the non-connected state.

In some embodiments, the exemplary method can also include the operations of block 1360, where the UE can perform synchronization with the network node, in at least one of time and frequency, based on receiving the connected-state RS during the first timeslots.

In addition, FIG. 14 shows a flow diagram of an exemplary method (e.g., procedure) for transmitting reference signals (RS) to one or more user equipment (UEs), according to various exemplary embodiments of the present disclosure. The exemplary method can be performed by a network node (e.g., base station, eNB, gNB, etc., or component thereof) serving a cell in a wireless network (e.g., E-UTRAN, NG-RAN), such as a network node configured according to other figures described herein.

The exemplary method can include the operations of block 1410, where the network node can transmit, to one or more UEs, a configuration for connected-state RS (as defined elsewhere herein) transmitted by the network node. In some embodiments, the configuration can be transmitted while the one or more UEs are in the connected state before entering the non-connected state. In some embodiments, the configuration can be transmitted as system information (SI) according to one of the following: broadcast in a cell of the wireless network; or via respective unicast messages to the one or more UEs.

The exemplary method can also include the operations of block 1430, where the network node can, while the one or more UEs are in a non-connected state (as defined elsewhere herein), transmit the connected-state RS during one or more first occasions associated with the configuration. In some embodiments, the connected-state RS can be periodic channel state information RS (CSI-RS) or periodic tracking RS (TRS).

In some embodiments, the exemplary method can also include the operations of block 1450, where the network node can transmit non-connected state RS during one or more second occasions while the one or more UEs are in the non-connected state. Furthermore, transmitting the connected-state RS during the first occasions (e.g., in block 1430) facilitates the one or more UEs to remain in a low-power operational mode and refrain from receiving the non-connected-state RS during the second occasions.

In some embodiments, the configuration for the connected-state RS includes indications of one or more of the following:
one or more scrambling codes;
time and frequency domain resource allocations;
transmission configuration indicator (TCI) state;
periodicity of the connected-state RS;
availability of the connected-state RS while the one or more UEs are in a non-connected state;

a reference time from which the connected-state RS will be available; and a validity duration for the configuration.

In some embodiments, the configuration can be transmitted via broadcast system information (SI) while the one or more UEs are in the non-connected state. In such embodiments, the reference time can be related to a paging occasion (PO) for the UEs.

In some embodiments, the availability of the connected-state RS can be indicated as one of the following with respect to all occasions indicated by the configuration:
  available in all occasions;
  potentially available in all occasions, subject to UE detection in each occasion;
  available in a subset of all occasions, the subset being indicated by the configuration or by layer-1 signaling (e.g., paging DCI) from the network node proximately before each occasion of the subset.

In some embodiments, the occasions can be indicated (i.e., by the configuration) based on one of the following: as absolute timeslot and/or subframe numbers; relative to timing of other signals or channels transmitted or received by the UE; or a parameter input to a function, from which the particular occasions can be determined.

In some embodiments, the occasions can be indicated based on the periodicity of the connected-state RS (e.g., in the configuration) and a subset of the occasions indicated by the periodicity. In some of these embodiments, the periodicity can be indicated based on paging occasions for the UE, and the subset of occasions can be indicated based on a number of consecutive timeslots or a number of milliseconds that immediately precede one of the following: one or more particular paging occasions for the one or more UEs, or one or more transmissions of non-connected state RS (e.g., SSB occasions).

In other embodiments, the occasions can be indicated based on a multiple of a periodicity of one of the following: paging occasions for the UE, or transmissions of non-connected-state RS (e.g., SSB occasions). The multiple can be an integer multiple, for example.

In some embodiments, the exemplary method can include the operations of block 1440, where the network node can refrain from transmitting the connected-state RS during at least one of the occasions indicated as potentially available (e.g., by the configuration). In other words, the first occasions in which the network node transmits the connected-state RS (e.g., in block 1430) may be fewer than and/or a subset of the occasions indicated as potentially available.

In some embodiments, when the configuration includes the validity duration, the exemplary method can also include the operations of block 1460, where after expiration of the validity duration, the network node can transmit, to the one or more UEs, a further configuration for connected-state RS transmitted by the network node. This further configuration can be transmitted via broadcast or unicast signaling, as described above, in the same or a different manner than the configuration transmitted in block 1410.

In some embodiments, the configuration can include first and second scrambling codes. In such embodiments, the transmitting operations of block 1430 can include the operations of sub-blocks 1431-1432. In sub-block 1431, the network node can transmit the connected-state RS scrambled based on the first scrambling code when the connected-state RS will be available for at least a first duration. In sub-block 1432, the network node can transmit the connected-state RS scrambled based on the second scrambling code when the connected-state RS will be available for a second duration that is less than the first duration. In various embodiments, the first duration can be one of the following: an amount of time after the current time; an amount of time after the one or more UEs enter a non-connected state; or indefinitely after the one or more UEs enter a non-connected state. In some embodiments, the configuration can also include the first duration (and, optionally, the second duration).

In some embodiments, the exemplary method can also include the operations of block 1420, where the network node can transmit, to the one or more UEs, an activation signal that indicates whether the configuration is activated or deactivated. In such embodiments, the connected-state RS can be transmitted during the first occasions (e.g., in block 1430) based on the activation signal indicating that the configuration is activated.

In various embodiments, the activation signal can be transmitted by the network node in one or more of the following:
  the same message as the configuration (e.g., in block 1410);
  a connection release message to a particular one of the UEs, while the particular UE is in the connected state;
  layer-1 signaling (e.g., paging DCI) from the network node while the one or more UEs are in the non-connected state; and
  SI broadcast in a cell of the wireless network.

In some of these embodiments, the configuration is one of a plurality of connected-state RS configurations transmitted to the one or more UEs while the one or more UEs are in the connected state. In such embodiments, the configuration can be activated by the connection release message (mentioned above), or the connection release message can indicate a selection of the configuration from the plurality of connected-state RS configurations.

In some of these embodiments, the activation signal can be transmitted as a field in paging downlink control information (DCI) during a paging occasion for the one or more UEs.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 15:
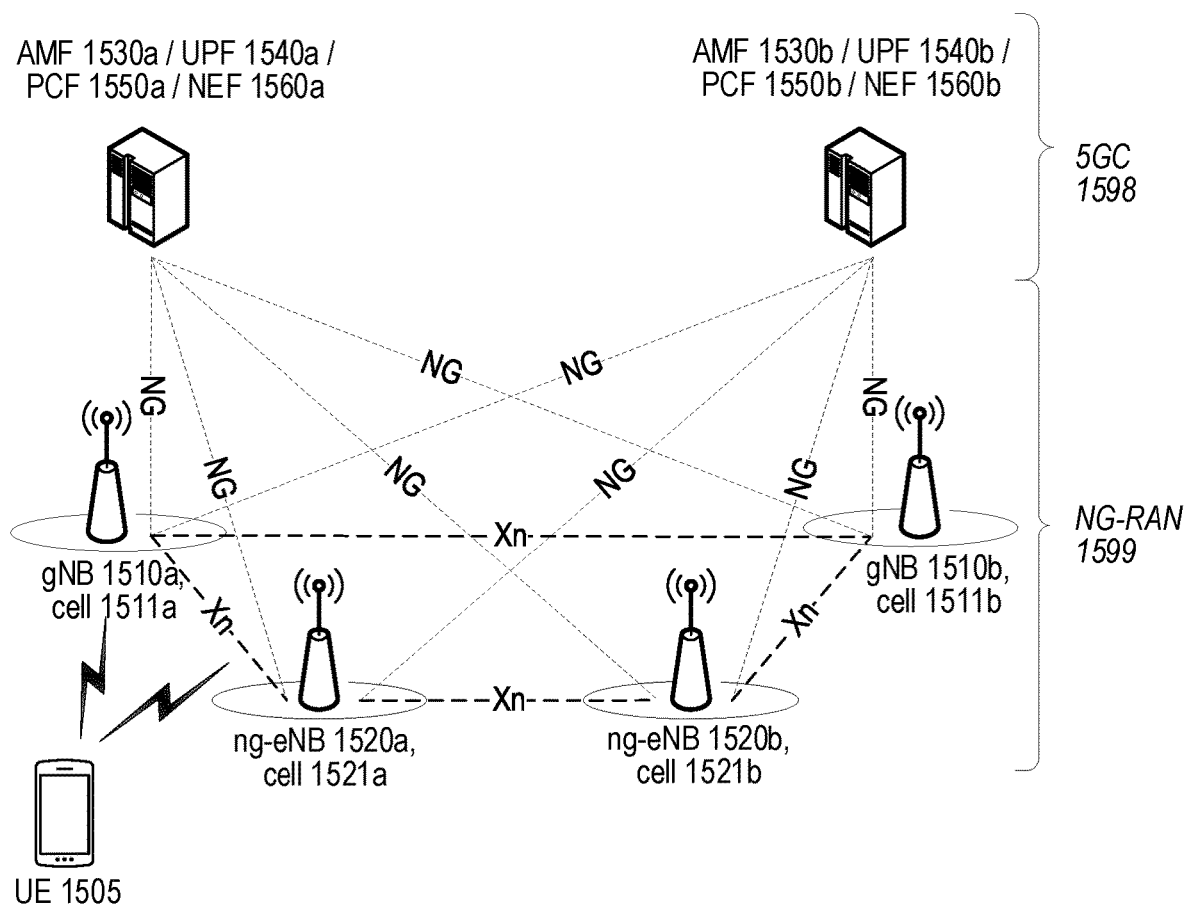
FIG. 15 illustrates a high-level view of an exemplary 5G network architecture, according to various exemplary embodiments of the present disclosure.

FIG. 15 shows a high-level view of an exemplary 5G network architecture, including a Next Generation Radio Access Network (NG-RAN) 1599 and a 5G Core (5GC) 1598. As shown in the figure, NG-RAN 1599 can include gNBs 1510 (e.g., 1510*a,b*) and ng-eNBs 1520 (e.g., 1520*a,b*) that are interconnected with each other via respective Xn interfaces. The gNBs and ng-eNBs are also connected via the NG interfaces to 5GC 1598, more specifically to the AMF (Access and Mobility Management Function) 1530 (e.g., AMFs 1530*a,b*) via respective NG-C interfaces and to the UPF (User Plane Function) 1540 (e.g., UPFs 1540*a,b*) via respective NG-U interfaces. Moreover, the AMFs 1530*a,b* can communicate with one or more policy control functions (PCFs, e.g., PCFs 1550*a,b*) and network exposure functions (NEFs, e.g., NEFs 1560*a,b*).

Each of the gNBs 1510 can support the NR radio interface including frequency division duplexing (FDD), time division duplexing (TDD), or a combination thereof. In contrast, each of ng-eNBs 1520 can support the LTE radio interface but, unlike conventional LTE eNBs (such as shown in FIG.

1), connect to the 5GC via the NG interface. Each of the gNBs and ng-eNBs can serve a geographic coverage area including one more cells, including cells 1511*a-b* and 1521*a-b* shown as exemplary in FIG. 15. The gNBs and ng-eNBs can also use various directional beams to provide coverage in the respective cells. Depending on the particular cell in which it is located, a UE 1505 can communicate with the gNB or ng-eNB serving that particular cell via the NR or LTE radio interface, respectively.

The gNBs shown in FIG. 15 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry. Moreover, the terms "central unit" and "centralized unit" can be used interchangeably, as can the terms "distributed unit" and "decentralized unit."

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU.

Figure 16:
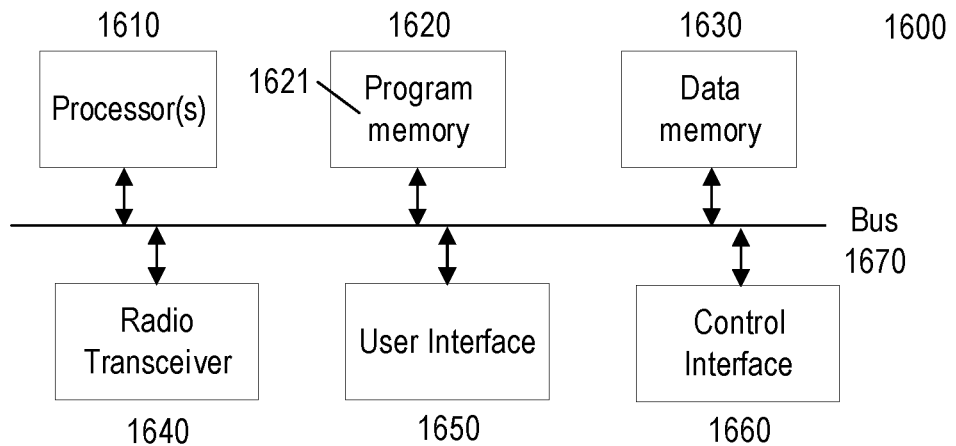
FIG. 16 shows a block diagram of an exemplary wireless device or UE, according to various exemplary embodiments of the present disclosure.

FIG. 16 shows a block diagram of an exemplary wireless device or user equipment (UE) 1600 (hereinafter referred to as "UE 1600") according to various embodiments of the present disclosure, including those described above with reference to other figures. For example, UE 1600 can be configured by execution of instructions, stored on a computer-readable medium, to perform operations corresponding to one or more of the exemplary methods described herein.

UE 1600 can include a processor 1610 (also referred to as "processing circuitry") that can be operably connected to a program memory 1620 and/or a data memory 1630 via a bus 1670 that can comprise parallel address and data buses, serial ports, or other methods and/or structures known to those of ordinary skill in the art. Program memory 1620 can store software code, programs, and/or instructions (collectively shown as computer program product 1621 in FIG. 16) that, when executed by processor 1610, can configure and/or facilitate UE 1600 to perform various operations, including operations corresponding to various exemplary methods described herein. As part of or in addition to such operations, execution of such instructions can configure and/or facilitate UE 1600 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1640, user interface 1650, and/or control interface 1660.

As another example, processor 1610 can execute program code stored in program memory 1620 that corresponds to MAC, RLC, PDCP, and RRC layer protocols standardized by 3GPP (e.g., for NR and/or LTE). As a further example, processor 1610 can execute program code stored in program memory 1620 that, together with radio transceiver 1640, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1610 can execute program code stored in program memory 1620 that, together with radio transceiver 1640, implements device-to-device (D2D) communications with other compatible devices and/or UEs.

Program memory 1620 can also include software code executed by processor 1610 to control the functions of UE 1600, including configuring and controlling various components such as radio transceiver 1640, user interface 1650, and/or control interface 1660. Program memory 1620 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1620 can comprise an external storage arrangement (not shown) remote from UE 1600, from which the instructions can be downloaded into program memory 1620 located within or removably coupled to UE 1600, so as to enable execution of such instructions.

Data memory 1630 can include memory area for processor 1610 to store variables used in protocols, configuration, control, and other functions of UE 1600, including operations corresponding to, or comprising, any of the exemplary methods described herein. Moreover, program memory 1620 and/or data memory 1630 can include non-volatile memory (e.g., flash memory), volatile memory (e.g., static or dynamic RAM), or a combination thereof. Furthermore, data memory 1630 can comprise a memory slot by which removable memory cards in one or more formats (e.g., SD Card, Memory Stick, Compact Flash, etc.) can be inserted and removed.

Persons of ordinary skill will recognize that processor 1610 can include multiple individual processors (including, e.g., multi-core processors), each of which implements a portion of the functionality described above. In such cases, multiple individual processors can be commonly connected to program memory 1620 and data memory 1630 or individually connected to multiple individual program memories and or data memories. More generally, persons of ordinary skill in the art will recognize that various protocols and other functions of UE 1600 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1640 can include radio-frequency transmitter and/or receiver functionality that facilitates the UE 1600 to communicate with other equipment supporting like wireless communication standards and/or protocols. In some exemplary embodiments, the radio transceiver 1640 includes one or more transmitters and one or more receivers that enable UE 1600 to communicate according to various protocols and/or methods proposed for standardization by 3GPP and/or other standards bodies. For example, such functionality can operate cooperatively with processor 1610 to implement a PHY layer based on OFDM, OFDMA, and/or SC-FDMA technologies, such as described herein with respect to other figures.

In some exemplary embodiments, radio transceiver 1640 includes one or more transmitters and one or more receivers that can facilitate the UE 1600 to communicate with various LTE, LTE-Advanced (LTE-A), and/or NR networks according to standards promulgated by 3GPP. In some exemplary embodiments of the present disclosure, the radio transceiver 1640 includes circuitry, firmware, etc. necessary for the UE 1600 to communicate with various NR, NR-U, LTE, LTE-A, LTE-LAA, UMTS, and/or GSM/EDGE networks, also according to 3GPP standards. In some embodiments, radio transceiver 1640 can include circuitry supporting D2D communications between UE 1600 and other compatible devices.

In some embodiments, radio transceiver 1640 includes circuitry, firmware, etc. necessary for the UE 1600 to communicate with various CDMA2000 networks, according to 3GPP2 standards. In some embodiments, the radio transceiver 1640 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1640 can include a transceiver that is capable of wired communication, such as by using IEEE 802.3 Ethernet technology. The functionality particular to each of these embodiments can be coupled with and/or controlled by other circuitry in the UE 1600, such as the processor 1610 executing program code stored in program memory 1620 in conjunction with, and/or supported by, data memory 1630.

User interface 1650 can take various forms depending on the particular embodiment of UE 1600, or can be absent from UE 1600 entirely. In some embodiments, user interface 1650 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1600 can comprise a tablet computing device including a larger touchscreen display. In such embodiments, one or more of the mechanical features of the user interface 1650 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1600 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1600 having a touch screen display are capable of receiving user inputs, such as inputs related to exemplary methods described herein or otherwise known to persons of ordinary skill.

In some embodiments, UE 1600 can include an orientation sensor, which can be used in various ways by features and functions of UE 1600. For example, the UE 1600 can use outputs of the orientation sensor to determine when a user has changed the physical orientation of the UE 1600's touch screen display. An indication signal from the orientation sensor can be available to any application program executing on the UE 1600, such that an application program can change the orientation of a screen display (e.g., from portrait to landscape) automatically when the indication signal indicates an approximate 160-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1660 of the UE 1600 can take various forms depending on the particular exemplary embodiment of UE 1600 and of the particular interface requirements of other devices that the UE 1600 is intended to communicate with and/or control. For example, the control interface 1660 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1660 can comprise an IEEE 802.3 Ethernet interface such as described above. In some exemplary embodiments of the present disclosure, the control interface 1660 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1600 can comprise more functionality than is shown in FIG. 16 including, for example, a video and/or still-image camera, microphone, media player and/or recorder, etc. Moreover, radio transceiver 1640 can include circuitry necessary to communicate using additional radio-frequency communication standards including Bluetooth, GPS, and/or others. Moreover, the processor 1610 can execute software code stored in the program memory 1620 to control such additional functionality. For example, directional velocity and/or position estimates output from a GPS receiver can be available to any application program executing on the UE 1600, including any program code corresponding to and/or embodying any exemplary embodiments (e.g., of methods) described herein.

Figure 17:
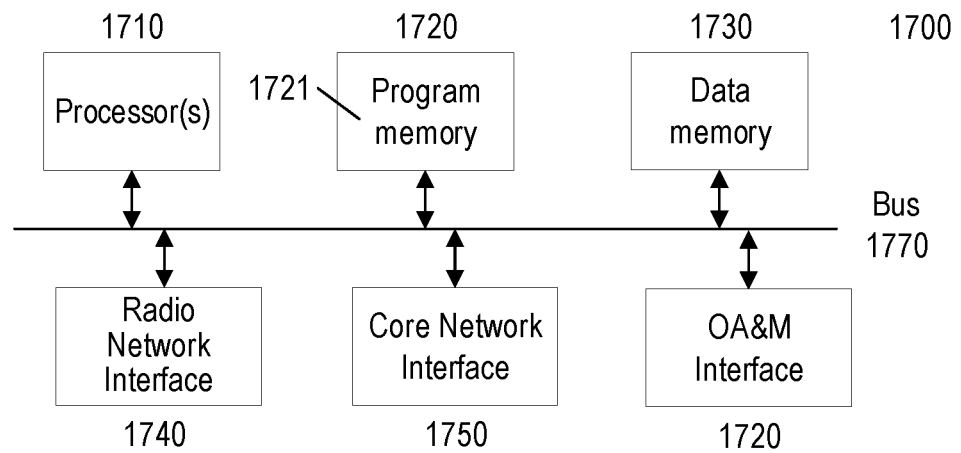
FIG. 17 shows a block diagram of an exemplary network node according to various exemplary embodiments of the present disclosure.

FIG. 17 shows a block diagram of an exemplary network node 1700 according to various embodiments of the present disclosure, including those described above with reference to other figures. For example, exemplary network node 1700 can be configured by execution of instructions, stored on a computer-readable medium, to perform operations corresponding to one or more of the exemplary methods described herein. In some exemplary embodiments, network node 1700 can comprise a base station, eNB, gNB, or one or more components thereof. For example, network node 1700 can be configured as a central unit (CU) and one or more distributed units (DUs) according to NR gNB architectures specified by 3GPP. More generally, the functionally of network node 1700 can be distributed across various physical devices and/or functional units, modules, etc.

Network node 1700 can include processor 1710 (also referred to as "processing circuitry") that is operably connected to program memory 1720 and data memory 1730 via bus 1770, which can include parallel address and data buses, serial ports, or other methods and/or structures known to those of ordinary skill in the art.

Program memory 1720 can store software code, programs, and/or instructions (collectively shown as computer program product 1721 in FIG. 17) that, when executed by processor 1710, can configure and/or facilitate network node 1700 to perform various operations, including operations corresponding to various exemplary methods described herein. As part of and/or in addition to such operations, program memory 1720 can also include software code executed by processor 1710 that can configure and/or facilitate network node 1700 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1740 and/or core network interface 1750. By way of example, core network interface 1750 can comprise the S1 or NG interface and radio network interface 1740 can comprise the Uu interface, as standardized by 3GPP. Program memory 1720 can also comprise software code executed by processor 1710 to control the functions of network node 1700, including configuring and controlling various components such as radio network interface 1740 and core network interface 1750.

Data memory 1730 can comprise memory area for processor 1710 to store variables used in protocols, configuration, control, and other functions of network node 1700. As such, program memory 1720 and data memory 1730 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1710 can include multiple individual processors (not shown), each of which implements a portion of the functionality described above. In such case, multiple individual processors may be commonly connected to program memory 1720 and data memory 1730 or individually connected to multiple individual program memories and/or data memories. More generally, persons of ordinary skill will recognize that various protocols and other functions of network node 1700 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1740 can comprise transmitters, receivers, signal processors, ASICs, antennas, beamforming units, and other circuitry that enables network node 1700 to communicate with other equipment such as, in some embodiments, a plurality of compatible user equipment (UE). In some embodiments, interface 1740 can also enable network node 1700 to communicate with compatible satellites of a satellite communication network. In some exemplary embodiments, radio network interface 1740 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1740. According to further exemplary embodiments of the present disclosure, the radio network interface 1740 can comprise a PHY layer based on OFDM, OFDMA, and/or SC-FDMA technologies. In some embodiments, the functionality of such a PHY layer can be provided cooperatively by radio network interface 1740 and processor 1710 (including program code in memory 1720).

Core network interface 1750 can comprise transmitters, receivers, and other circuitry that enables network node 1700 to communicate with other equipment in a core network such as, in some embodiments, circuit-switched (CS) and/or packet-switched Core (PS) networks. In some embodiments, core network interface 1750 can comprise the S1 interface standardized by 3GPP. In some embodiments, core network interface 1750 can comprise the NG interface standardized by 3GPP. In some exemplary embodiments, core network interface 1750 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1750 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1700 can include hardware and/or software that configures and/or facilitates network node 1700 to communicate with other network nodes in a RAN, such as with other eNBs, gNBs, ng-eNBs, en-gNBs, IAB nodes, etc. Such hardware and/or software can be part of radio network interface 1740 and/or core network interface 1750, or it can be a separate functional unit (not shown). For example, such hardware and/or software can configure and/or facilitate network node 1700 to communicate with other RAN nodes via the X2 or Xn interfaces, as standardized by 3GPP.

OA&M interface 1760 can comprise transmitters, receivers, and other circuitry that enables network node 1700 to communicate with external networks, computers, databases, and the like for purposes of operations, administration, and maintenance of network node 1700 or other network equipment operably connected thereto. Lower layers of OA&M interface 1760 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1740, core network interface 1750, and OA&M interface 1760 may be multiplexed together on a single physical interface, such as the examples listed above.

Figure 18:
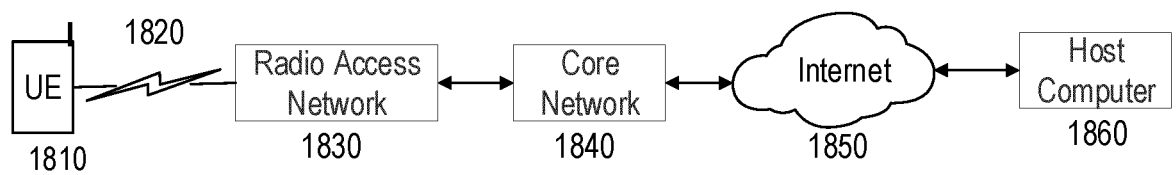
FIG. 18 shows a block diagram of an exemplary network configured to provide over-the-top (OTT) data services between a host computer and a UE, according to various exemplary embodiments of the present disclosure.

FIG. 18 is a block diagram of an exemplary communication network configured to provide over-the-top (OTT) data services between a host computer and a user equipment (UE), according to one or more exemplary embodiments of the present disclosure. UE 1810 can communicate with radio access network (RAN) 1830 over radio interface 1820, which can be based on protocols described above including, e.g., LTE, LTE-A, and 5G/NR. For example, UE 1810 can be configured and/or arranged as shown in other figures discussed above.

RAN 1830 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1830 can cooperatively operate using licensed and unlicensed spectrum. In some embodiments, RAN 1830 can include, or be capable of communication with, one or more satellites comprising a satellite access network.

RAN 1830 can further communicate with core network 1840 according to various protocols and interfaces described above. For example, one or more apparatus (e.g., base stations, eNBs, gNBs, etc.) comprising RAN 1830 can communicate to core network 1840 via core network interface 1850 described above. In some exemplary embodiments, RAN 1830 and core network 1840 can be configured and/or arranged as shown in other figures discussed above. For example, eNBs comprising an E-UTRAN 1830 can communicate with an EPC core network 1840 via an S1 interface. As another example, gNBs and ng-eNBs comprising an NG-RAN 1830 can communicate with a 5GC core network 1830 via an NG interface.

Core network 1840 can further communicate with an external packet data network, illustrated in FIG. 18 as Internet 1850, according to various protocols and interfaces known to persons of ordinary skill in the art. Many other devices and/or networks can also connect to and communicate via Internet 1850, such as exemplary host computer 1860. In some exemplary embodiments, host computer 1860 can communicate with UE 1810 using Internet 1850, core network 1840, and RAN 1830 as intermediaries. Host computer 1860 can be a server (e.g., an application server) under ownership and/or control of a service provider. Host computer 1860 can be operated by the OTT service provider or by another entity on the service provider's behalf.

For example, host computer 1860 can provide an over-the-top (OTT) packet data service to UE 1810 using facilities of core network 1840 and RAN 1830, which can be unaware of the routing of an outgoing/incoming communication to/from host computer 1860. Similarly, host computer 1860 can be unaware of routing of a transmission from the host computer to the UE, e.g., the routing of the transmission through RAN 1830. Various OTT services can be provided using the exemplary configuration shown in FIG. 18 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 18 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide a flexible mechanism for a network node (e.g., gNB) in a wireless network (e.g., NG-RAN) to inform served UEs about presence/absence and/or configuration of non-SSB reference signals (RS) available to the UE in a non-connected state (i.e., RRC_IDLE or RRC_INACTIVE), particularly non-SSB RS that are conventionally available to the UE only in RRC_CONNECTED state. Based on receiving such indications, the UE to maintain synchronization and/or AGC while in a non-connected state, based on receiving and/or measuring connected-state RS such that the UE does not have to remain awake to receive non-connected-state RS (e.g., SSB). When used in NR UEs (e.g., UE 1810) and gNBs (e.g., gNBs comprising RAN 1830), exemplary embodiments described herein can provide various improvements, benefits, and/or advantages in terms of reduced UE energy consumption in non-connected states. This reduction can increase the use of data services by allowing the UE to allocate a greater portion of its stored energy for data services (e.g., eMBB) while in connected state. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

E1. A method, performed by a user equipment (UE), for receiving reference signals (RS) transmitted by a network node in a wireless network, the method comprising: receiving, from the network node, a configuration for connected-state RS transmitted by the network node; while the UE is in a non-connected state and based on the received configuration, determining one or more first timeslots during which the connected-state RS will be available; and while the UE is in the non-connected state, receiving the connected-state RS during the first timeslots.

E2. The method of embodiment E1, further comprising, while receiving the connected-stated RS during the first timeslots, remaining in a low-power operational mode during one or more second timeslots during which non-connected-state RS are transmitted by the network node.

E3. The method of any of embodiments E1-E2, wherein the configuration is received while the UE is in the connected state before entering the non-connected state.

E4. The method of any of embodiments E1-E3, wherein the configuration is received as system information (SI) according to one of the following: broadcast in a cell of the wireless network; or via a unicast message from the network node.

E5. The method of any of embodiments E1-E4, wherein the configuration for the connected-state RS includes indications of one or more of the following: one or more scrambling codes; time and frequency domain resource allocations; transmission configuration indicator (TCI) state; periodicity of the connected-state RS; availability of the connected-state RS while the UE is in a non-connected state; a reference time from which the connected-state RS will be available; and a validity duration for the configuration.

E6. The method of embodiment E5, wherein: the configuration is received via broadcast system information (SI) while the UE is in the non-connected state; and the reference time is related to a paging occasion for the UE.

E7. The method of any of embodiments E5-E6, wherein the indication of time-domain resource allocations comprises an indication of one or more particular occasions in which the connected-state RS will be available.

E8. The method of embodiment E7, wherein the one or more particular occasions are indicated based on one of the following: as absolute timeslot and/or subframe numbers; relative to timing of other signals or channels transmitted or received by the UE; or a parameter input to a function, from which the particular occasions can be determined.

E9. The method of any of embodiments E7-E8, wherein the one or more particular occasions are indicated based on: the periodicity of the connected-state RS; and a subset of the occasions indicated by the periodicity.

E10. The method of embodiment E9, wherein: the periodicity is indicated based on paging occasions for the UE; and the subset of occasions is indicated based on a number of consecutive timeslots or a number of milliseconds that immediately precede one of the following: one or more particular paging occasions for the UE, or one or more transmissions of non-connected state RS.

E11. The method of any of embodiments E7-E8, wherein the one or more particular occasions are indicated based on a multiple of a periodicity of one of the following: paging occasions for the UE, or transmissions of non-connected-state RS.

E12. The method of any of embodiments E5-E11, further comprising, after expiration of the validity duration for the configuration, receiving, from the network node, a further configuration for connected-state RS transmitted by the network node.

E13. The method of embodiment E12, further comprising: while the UE is in the non-connected state, monitoring broadcast system information (SI) for the configuration; in response to receiving the configuration via the broadcast SI, refraining from monitoring broadcast SI during the validity duration while receiving the connected-state RS; and resuming monitoring SI for the further configuration after expiration of the validity duration.

E14. The method of any of embodiments E5-E11, wherein: the configuration includes first and second scrambling codes; the first scrambling code indicates that the connected-state RS will be available for at least a first duration; and the second scrambling code indicates that the connected-state RS will be available for a second duration that is less than the first duration.

E15. The method of embodiment E14, wherein the first duration is one of the following: an amount of time after the current time; an amount of time after the UE enters a non-connected state; indefinitely after the UE enters a non-connected state.

E16. The method of any of embodiments E14-E15, wherein the configuration also includes the first duration.

E17. The method of any of embodiments E14-E16, wherein receiving the connected-state RS during the first timeslots comprises: based on detecting the connected-state RS scrambled according to the first scrambling code during one of the first timeslots, receiving the connected-state RS until the end of the first duration; and based on detecting the connected-state RS scrambled according to the second scrambling code during one of the first timeslots, performing one of the following operations: attempting to detect the connected-state RS scrambled according to either the first or second scrambling codes during a subsequent one of the first timeslots, or monitoring broadcast system information for a further configuration for connected-state RS transmitted by the network node.

E18. The method of any of embodiments E1-E17, wherein: the method further comprises receiving, from the network node, an activation signal that indicates whether the configuration is activated or deactivated; and determining the one or more first timeslots during which the connected-state RS will be available is further based on the activation signal indicating that the configuration is activated.

E19. The method of embodiment E18, wherein the activation signal is received in one or more of the following: the same message as the configuration; a connection release message from the network node, while the UE is in the connected state; a paging message from the network node, while the UE is in the non-connected state; or system information (SI) broadcast in a cell of the wireless network.

E20. The method of embodiment E19, wherein: the configuration is one of a plurality of available connected-state RS configurations received by the UE while in the connected state; and one of the following conditions applies: the configuration is activated by the connection release message; or the connection release message indicates a selection of the configuration from the available connected-state RS configurations.

E21. The method of any of embodiments E18-E20, wherein receiving the connected-state RS during the first timeslots further comprises, when the activation signal indicates that the configuration is deactivated, receiving non-connected-state RS instead of the connected-state RS while the UE is in the non-connected state.

E22. The method of any of embodiments E1-E21, further comprising performing synchronization with the network node, in at least one of time and frequency, based on receiving the connected-state RS during the first timeslots.

E23. A method, performed by a network node in a wireless network, for transmitting reference signals (RS) to one or more user equipment (UEs), the method comprising: transmitting, to one or more UEs, a configuration for connected-state RS transmitted by the network node; and while the one or more UEs are in a non-connected state, transmitting the connected-state RS during one or more first timeslots associated with the configuration.

E24. The method of embodiment E23, wherein: the method further comprises transmitting non-connected state RS during one or more second timeslots while the one or more UEs are in the non-connected state; and transmitting the connected-state RS during the first timeslots facilitates the one or more UEs to remain in a low-power operational mode during the second timeslots.

E24. The method of any of embodiments E22-E23, wherein the configuration is transmitted while the one or more UEs are in the connected state before entering the non-connected state.

E25. The method of any of embodiments E22-E24, wherein the configuration is transmitted as system information (SI) according to one of the following: broadcast in a cell of the wireless network; or via respective unicast messages to the one or more UEs.

E26. The method of any of embodiments E22-E25, wherein the configuration for the connected-state RS includes indications of one or more of the following: one or more scrambling codes; time and frequency domain resource allocations; transmission configuration indicator (TCI) state; periodicity of the connected-state RS; availability of the connected-state RS while the one or more UEs are in a non-connected state; a reference time from which the connected-state RS will be available; and a validity duration for the configuration.

E27. The method of embodiment E26, wherein: the configuration is transmitted via broadcast system information (SI) while the one or more UEs are in the non-connected state; and the reference time is related to a paging occasion for the one or more UEs.

E28. The method of any of embodiments E26-E27, wherein the indication of time-domain resource allocations comprises an indication of one or more particular occasions in which the connected-state RS will be available.

E29. The method of embodiment E28, wherein the one or more particular occasions are indicated based on one of the following: as absolute timeslot and/or subframe numbers; relative to timing of other signals or channels transmitted or received by the one or more UEs; or a parameter input to a function, from which the particular occasions can be determined.

E30. The method of any of embodiments E28-E29, wherein the one or more particular occasions are indicated based on: the periodicity of the connected-state RS; and a subset of the occasions indicated by the periodicity.

E31. The method of embodiment E30, wherein: the periodicity is indicated based on paging occasions for the one or more UEs; and the subset of occasions is indicated based on a number of consecutive timeslots or a number of milliseconds that immediately precede one of the following: one or more particular paging occasions for the one or more UEs, or one or more transmissions of non-connected state RS.

E32. The method of any of embodiments E28-E29, wherein the one or more particular occasions are indicated based on a multiple of a periodicity of one of the following: paging occasions for the one or more UEs, or transmissions of non-connected-state RS.

E33. The method of any of embodiments E26-E32, further comprising, after expiration of the validity duration for the configuration, transmitting, to the one or more UEs, a further configuration for connected-state RS transmitted by the network node.

E34. The method of any of embodiments E26-E33, wherein: the configuration includes first and second scrambling codes; transmitting the connected-state RS during the one or more first timeslots comprises: transmitting the connected-state RS scrambled based on the first scrambling code when the connected-state RS will be available for at least a first duration; and transmitting the connected-state RS scrambled based on the second scrambling code when the connected-state RS will be available for a second duration that is less than the first duration.

E35. The method of embodiment E23, wherein the first duration is one of the following: an amount of time after the current time; an amount of time after the UE enters a non-connected state; indefinitely after the UE enters a non-connected state.

E36. The method of any of embodiments E34-E35, wherein the configuration also includes the first duration.

E37. The method of any of embodiments E22-E36, wherein: the method further comprises transmitting, to the one or more UEs, an activation signal that indicates whether the configuration is activated or deactivated; and the connected-state RS are transmitted during the first timeslots based on the activation signal indicating that the configuration is activated.

E38. The method of embodiment E37, wherein the activation signal is transmitted in one or more of the following: the same message as the configuration; a connection release message to a particular one of the UEs, while the particular UE is in the connected state; a paging message from the network node, while the one or more UEs are in the non-connected state; and system information (SI) broadcast in a cell of the wireless network.

E39. The method of embodiment E38, wherein: the configuration is one of a plurality of available connected-state RS configurations transmitted to the one or more UEs while the one or more UEs are in the connected state; and one of the following conditions applies: the configuration is activated by the connection release message; or the connection release message indicates a selection of the configuration from the available connected-state RS configurations.

E40. A user equipment (UE) configured to receive reference signals (RS) transmitted by a network node in a wireless network, the UE comprising: radio transceiver circuitry configured to communicate with the network node; and processing circuitry operatively coupled to the radio transceiver circuitry, whereby the processing circuitry and the radio transceiver circuitry are configured to perform operations corresponding to any of the methods of embodiments E1-E22.

E41. A user equipment (UE) configured to receive reference signals (RS) transmitted by a network node in a wireless network, the UE being further arranged to perform operations corresponding to any of the methods of embodiments E1-E22.

E42. A non-transitory, computer-readable medium storing computer-executable instructions that, when executed by processing circuitry of a user equipment (UE) configured to receive reference signals (RS) transmitted by a network node in a wireless network, configure the UE to perform operations corresponding to any of the methods of embodiments E1-E22.

E43. A computer program product comprising computer-executable instructions that, when executed by processing circuitry of a user equipment (UE) configured to receive reference signals (RS) transmitted by a network node in a wireless network, configure the UE to perform operations corresponding to any of the methods of embodiments E1-E22.

E44. A network node, in a wireless network, configured to transmit reference signals (RS) to one or more user equipment (UEs), the network node comprising: radio network interface circuitry configured to communicate with the UEs; and processing circuitry operatively coupled to the radio network interface circuitry, whereby the processing circuitry and the radio network interface circuitry are configured to perform operations corresponding to any of the methods of embodiments E23-E39.

E45. A network node, in a wireless network, configured to transmit reference signals (RS) to one or more user equipment (UEs), the network node being further arranged to perform operations corresponding to any of the methods of embodiments E23-E39.

E46. A non-transitory, computer-readable medium storing computer-executable instructions that, when executed by processing circuitry of a network node configured to transmit reference signals (RS) to one or more user equipment (UEs), configure the network node to perform operations corresponding to any of the methods of embodiments E23-E39.

E47. A computer program product comprising computer-executable instructions that, when executed by processing circuitry of a network node configured to transmit reference signals (RS) to one or more user equipment (UEs), configure the network node to perform operations corresponding to any of the methods of embodiments E23-E39.

The invention claimed is:

1. A method, performed by a user equipment (UE), for receiving reference signals (RS) in a wireless network, the method comprising:
   receiving, from a network node in the wireless network, a configuration for RS, wherein the RS are periodic channel state information RS (CSI-RS) or periodic tracking RS (TRS);
   while the UE is in a non-connected state, determining that the RS are available during one or more first occasions, wherein the determining is based on the received configuration and on a field in paging downlink control information (DCI) detected by the UE during a paging occasion while in the non-connected state, wherein the field indicates that the configuration is activated; and
   while the UE is in the non-connected state, selectively receiving the RS during the first occasions.

2. The method of claim 1, wherein selectively receiving the RS comprises:
   for each first occasion, determining whether reception of the RS during the first occasion would reduce UE energy consumption;
   refraining from receiving the RS during first occasions for which it was determined that reception of the RS would not reduce UE energy consumption; and
   receiving the RS during first occasions for which it was determined that reception of the RS would reduce UE energy consumption.

3. The method of claim 1, further comprising:
   based on receiving the RS during the first occasions, remaining in a low-power operational mode during one or more second occasions in which other RS are available to UEs in non-connected states; and, based on determining that the RS are unavailable during the first occasions, receiving the other RS in a non-low-power operational mode during the second occasions.

4. The method of claim 1, wherein the configuration for RS is received while the UE is in the connected state before entering the non-connected state.

5. The method of claim 1, wherein the configuration for RS is received as system information (SI) according to one of the following:
broadcast in a cell of the wireless network; or
via a unicast message from the network node.

6. The method of claim 1, wherein the configuration for RS includes indications of a validity duration for the configuration.

7. The method of claim 6, wherein the availability of the RS is indicated as one of the following with respect to all occasions indicated by the configuration:
available in all occasions;
potentially available in all occasions, subject to UE detection in each occasion;
available in a subset of all occasions, the subset being indicated by one of the following: the configuration, or layer-1 signaling from the network node proximately before each occasion of the subset.

8. The method of claim 7, wherein the occasions are indicated based on one of the following:
absolute timeslot and/or subframe numbers;
relative to timing of other signals or channels transmitted or received by the UE; or
a parameter input to a function, from which the occasions can be determined.

9. The method of claim 8, wherein the occasions are indicated based on the following:
the periodicity of the RS; and
a subset of the occasions indicated by the periodicity.

10. The method of claim 1, further comprising performing synchronization with the network node, in at least one of time and frequency, based on receiving the RS during the first occasions.

11. The method of claim 1, wherein the paging DCI is included in layer-1 signaling from the network node while the UE is in the non-connected state.

12. A method, performed by a network node in a wireless network, for transmitting reference signals (RS) to one or more user equipment (UEs), the method comprising:
transmitting, to one or more UEs, a configuration for RS, wherein the RS are periodic channel state information RS (CSI-RS) or periodic tracking RS (TRS);
while the one or more UEs are in the non-connected state, transmitting paging downlink control information (DCI) during a paging occasion for the one or more UEs, wherein the paging DCI includes a field that indicates the configuration is activated; and
while the one or more UEs are in the non-connected state, transmitting the RS during one or more first occasions associated with the configuration.

13. The method of claim 12, wherein the configuration for the RS includes indications of a validity duration for the configuration.

14. A user equipment (UE) configured to receive reference signals (RS) in a wireless network, the UE comprising:
radio transceiver circuitry configured to communicate with a network node in the wireless network; and
processing circuitry operatively coupled to the radio transceiver circuitry, whereby the processing circuitry and the radio transceiver circuitry are configured to:
receive, from the network node, a configuration for RS, wherein the RS are periodic channel state information RS (CSI-RS) or periodic tracking RS (TRS);
while the UE is in a non-connected state, determine that the connected-state RS are available during one or more first occasions, wherein the determination is based on the received configuration and on a field in paging downlink control information (DCI) detected by the UE during a paging occasion while in the non-connected state, wherein the field indicates that the configuration is activated; and
while the UE is in the non-connected state, selectively receive the RS during the first occasions.

15. The UE of claim 14, wherein the configuration for RS includes indications of a validity duration for the configuration.

16. The UE of claim 14, wherein the paging DCI is included in layer-1 signaling from the network node while the UE is in the non-connected state.

17. A network node, in a wireless network, configured to transmit reference signals (RS) to one or more user equipment (UEs), the network node comprising:
radio network interface circuitry configured to communicate with the UEs; and
processing circuitry operatively coupled to the radio network interface circuitry, whereby the processing circuitry and the radio network interface circuitry are configured to perform operations corresponding to the method of claim 12.

18. The network node of claim 17, wherein the configuration for RS includes indications of a validity duration for the configuration.

* * * * *